(12) United States Patent
Fukuchi et al.

(10) Patent No.: US 7,830,106 B2
(45) Date of Patent: Nov. 9, 2010

(54) CONTROLLER FOR MOTOR

(75) Inventors: Masanari Fukuchi, Wako (JP);
Hirofumi Atarashi, Wako (JP); Kenji Tsukamoto, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 652 days.

(21) Appl. No.: 11/882,561

(22) Filed: Aug. 2, 2007

(65) Prior Publication Data
US 2008/0030163 A1 Feb. 7, 2008

(30) Foreign Application Priority Data
Aug. 4, 2006 (JP) ............................. 2006-212870

(51) Int. Cl.
*H02P 7/00* (2006.01)

(52) U.S. Cl. .................. 318/432; 318/434; 318/400.02; 318/400.14; 318/400.38

(58) Field of Classification Search .................. 318/432, 318/434, 400.02, 400.14, 400.38
See application file for complete search history.

(56) References Cited

U.S. PATENT DOCUMENTS

| | | | |
|---|---|---|---|
| 4,305,031 A | 12/1981 | Wharton | |
| 5,245,238 A | 9/1993 | Lynch et al. | |
| 6,563,246 B1 | 5/2003 | Kajiura et al. | |
| 2007/0290633 A1* | 12/2007 | Atarashi et al. | 318/66 |
| 2008/0024082 A1* | 1/2008 | Atarashi et al. | 318/496 |
| 2008/0056690 A1* | 3/2008 | Fujishiro et al. | 388/820 |

FOREIGN PATENT DOCUMENTS

| | | |
|---|---|---|
| EP | 1 350 665 A2 | 8/2003 |
| JP | 2002-204541 | 7/2002 |
| JP | 2004-072978 A | 3/2004 |

OTHER PUBLICATIONS

Atsuo Kawamura et al, "Analysis on the Two Axis Motor (Super Motor) for Electric Vehicles", In: Motion Control, 2004 AMC '04, the 8th IEEE International Workshop on 25-58 March, pp. 71-74.

* cited by examiner

*Primary Examiner*—Walter Benson
*Assistant Examiner*—Erick Glass
(74) *Attorney, Agent, or Firm*—Arent Fox LLP

(57) ABSTRACT

A controller for a motor that can set an induced voltage constant of a motor of a double rotor type according to an operational state of the motor and expand the controllable range of the motor. The controller may include a command calculator that calculates a command value of the induced voltage constant of a motor based on the output voltage of a direct-current power supply, the number of revolutions Nm of the motor and a torque command in such a manner that the magnitude of a vector sum of a d-axis current and a q-axis current that have to be supplied in order to produce the torque according to the torque command is minimized, and a phase difference controller that calculates a command value of a rotor phase difference according to the command value and outputs the command value to an actuator to change the rotor phase difference.

14 Claims, 22 Drawing Sheets

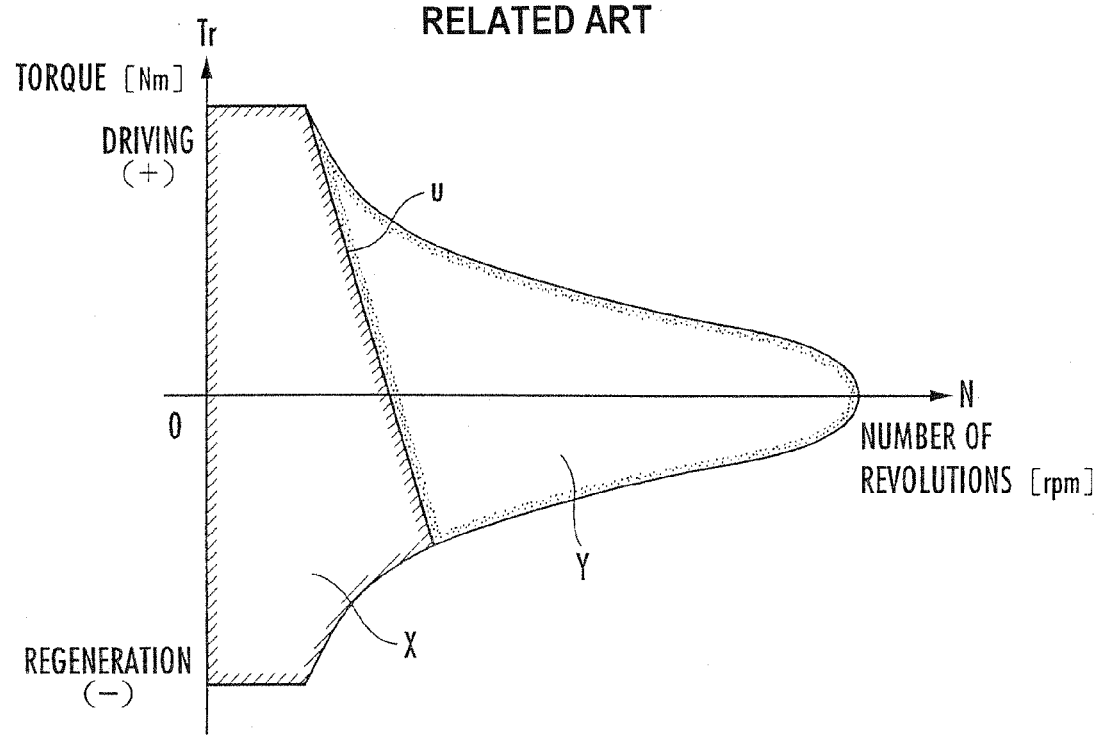

CONTROLLER FOR MOTOR

BACKGROUND OF THE INVENTION

1. Field of the Invention

The present invention relates to a controller for a motor that carries out field control of a permanent magnet field type rotary motor by changing the phase difference between two rotors disposed concentrically.

2. Description of the Related Art

There has been known a motor that comprises a permanent magnet field type rotary motor that has a first rotor and a second rotor concentrically disposed around a rotating shaft and carries out field weakening control by changing the phase difference between the first rotor and the second rotor according to the rotational velocity to change the induced voltage constant of the motor (see Japanese publication of unexamined patent application No. 2002-204541).

In such a conventional motor, the first rotor and the second rotor are connected via a member that is displaced in the radial direction by the action of a centrifugal force. The motor is configured so that, when the motor is halted, the magnetic pole of the permanent magnet on the first rotor and the magnetic pole of the permanent magnetic pole on the second rotor are oriented in the same direction, and thus the magnetic flux of the field is maximized (the induced voltage constant of the motor is maximized). In addition, the motor is configured so that, as the rotational velocity of the motor increases, the phase difference between the first rotor and the second rotor increases by the action of the centrifugal force, and thus the magnetic flux of the field decreases (the induced voltage constant of the motor decreases).

FIG. 22 shows a region for which field weakening of the motor is required. In this drawing, the axis of ordinates indicates the output torque Tr, and the axis of abscissas indicates the number of revolutions N. Reference character "u" in FIG. 22 denotes an orthogonal line of the motor (a line connecting points at which the phase voltage of the motor equals to the power supply voltage when the motor operates without the field weakening control and determined depending on the combination of the number of revolutions and the output torque). In this drawing, reference character X denotes a region for which the field weakening is not required, and reference character Y denotes a region for which the field weakening is required.

As shown in FIG. 22, the region Y for which the field weakening is required is determined by the number of revolutions N and the output torque Tr of the motor. Therefore, the conventional field weakening control that relies merely on the number of revolutions has a disadvantage that the induced voltage constant of the motor is changed excessively or insufficiently with respect to the required amount of field weakening control.

In addition, since the induced voltage constant cannot be changed independently of the number of revolutions of the motor, there is a disadvantage that an appropriate induced voltage constant cannot be set by taking into account operational conditions other than the number of revolutions, such as limitations on the output torque of the motor and the current that can be supplied, and thus the controllable range of the motor is narrow.

The present invention has been made in view of such circumstances, and an object of the present invention is to provide a controller for a motor that can appropriately set the induced voltage constant of a motor of a double rotor type according to the operational state of the motor and expand the controllable range of the motor.

SUMMARY OF THE INVENTION

The present invention has been made in order to attain the object described above and relates to improvement of a controller for a motor that controls the operation of a permanent magnet field type rotary motor that has a first rotor and a second rotor having a plurality of fields constituted by permanent magnets and disposed around a rotating shaft, the controller comprising: a rotor phase difference changing means that changes the rotor phase difference between the first rotor and the second rotor; an inverter that converts a direct-current voltage supplied from a direct-current power supply into a polyphase alternating-current voltage and applies the polyphase alternating-current voltage to an armature of the motor; and an energization controlling means that controls a phase current, which is a vector sum of currents flowing through armatures of the respective phases of the motor via the inverter, according to a predetermined torque command.

The controller further comprises: a number-of-revolutions detecting means that detects the number of revolutions of the motor; and a rotor phase difference controlling means that makes the rotor phase difference changing means change the rotor phase difference based on the output voltage of the direct-current power supply, the number of revolutions of the motor and the torque command in such a manner that the phase current required to produce a torque according to the torque command is minimized.

According to the present invention, the rotor phase difference controlling means changes the rotor phase difference according to the operational state of the motor in such a manner that the magnitude of the phase current required to produce the torque according to the torque command is minimized. Therefore, the controllable range of the motor can be expanded as much as possible within the range of the phase current energization capability of the energization controlling means.

Furthermore, the rotor phase difference controlling means applies a correlation map for determining an induced voltage constant that minimizes the phase current of the motor for direct-current voltage supplied to the inverter, number of revolutions of the motor and torque of the motor, which are preset, to the output voltage of the direct-current power supply, the number of revolutions of the motor detected by the number-of-revolutions detecting means and the torque command, thereby obtaining an induced voltage constant therefor, and changes the rotor phase difference of the motor according to the obtained induced voltage constant.

According to the present invention, the rotor phase difference controlling means can obtain the optimal induced voltage constant suitable for the operational state of the motor by using the correlation map. Thus, the rotor phase difference controlling means can set the rotor phase difference that minimizes the phase current according to the operational state of the motor by changing the rotor phase difference of the motor according to the obtained induced voltage constant.

Furthermore, the motor is converted into an equivalent circuit having a d-axis armature on a d-axis extending in the direction of magnetic fluxes of the fields and a q-axis armature on a q-axis orthogonal to the d-axis, the energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current as a first dq current setting based on the induced voltage constant of the motor according to the rotor phase difference, wherein the combination is among combinations of a d-axis current and a q-axis current that provide the torque according to the torque command, the current command setting means estimates induced voltages produced in the d-axis armature and the q-axis armature when a d-axis current and a q-axis current according to the first dq current setting are supplied, respectively, based on the induced voltage constant of the motor according to the rotor phase difference and the number of revolutions of the motor, and the current command setting means designates the d-axis current according to the first dq current setting as a command value of the d-axis current and the q-axis current according to the first dq current setting as a command value of the q-axis current in the case where a dq determination voltage, which is a vector sum of the estimated induced voltage produced in the d-axis armature and the estimated induced voltage produced in the q-axis armature, is equal to or lower than a limited voltage set according to the output voltage of the direct-current power supply, and a first dq determination current, which has a magnitude equal to the magnitude of the dq-axis current according to the first dq current setting, is equal to or lower than a predetermined limited current.

According to the present invention, under the operational condition of the motor that there is no limitations by the limited voltage and the limited current, the current command setting means sets a command value of the d-axis current and a command value of the q-axis current according to the first dq current setting that minimizes the magnitude of the dq current for the torque command. Thus, the controllable range of the motor in which the torque according to the torque command can be produced can be expanded.

Furthermore, in the case where the dq determination voltage is equal to or lower than the limited voltage, and the first dq determination current is higher than the limited current, the current command setting means designates a combination of a d-axis current and a q-axis current that makes the magnitude of the dq-axis current equal to the magnitude of the limited current and maximizes the torque of the motor as a second dq current setting and designates the d-axis current according to the second dq current setting as a command value of the d-axis current and the q-axis current according to the second dq current setting as a command value of the q-axis current.

According to the present invention, under the operational condition of the motor that there is a limitation of the limited current, although there is no limitation of the limited voltage, the current command setting means set a command value of the d-axis current and a command value of the q-axis current according to the second dq current setting that maximizes the output torque of the motor within a range where the magnitude of the dq current is equal to the magnitude of the limited current. Thus, the controllable range of the motor within the range defined by the limited current can be expanded.

Furthermore, the motor is converted into an equivalent circuit having a d-axis armature on a d-axis extending in the direction of magnetic fluxes of the fields and a q-axis armature on a q-axis orthogonal to the d-axis, the energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current as a first dq current setting based on the induced voltage constant of the motor according to the rotor phase difference, wherein the combination is among combinations of a d-axis current and a q-axis current that provide the torque according to the torque command, and the current command setting means estimates induced voltages produced in the d-axis armature and the q-axis armature when a d-axis current and a q-axis current according to the first dq current setting are supplied, respectively, based on the induced voltage constant of the motor according to the rotor phase difference and the number of revolutions of the motor, and the current command setting means determines whether or not a second dq determination current having a magnitude equal to the magnitude of the dq-axis current according to a third dq current setting is equal to or lower than a predetermined limited current if the third dq current setting, which is a combination of a d-axis current and a q-axis current that maximizes the torque of the motor, can be calculated in the case where a dq determination voltage, which is a vector sum of the estimated induced voltage produced in the d-axis armature and the estimated induced voltage produced in the q-axis armature, is higher than a limited voltage set according to the output voltage of the direct-current power supply, and a dq induced voltage, which is a vector sum of the induced voltage produced in the d-axis armature and the induced voltage produced in the q-axis armature, is equal to the limited voltage, and designates the d-axis current according to the third dq current setting as a command value of the d-axis current and the q-axis current according to the third dq current setting as a command value of the q-axis current if the second dq determination current is equal to or lower than the limited current.

According to the present invention, under the operational condition of the motor that the third dq current setting that makes the magnitude of the dq current equal to or lower than the limited current when the dq induced voltage is equal to the limited voltage can be calculated, although there is a limitation of the limited voltage, the current command setting means sets a command value of the d-axis current and a command value of the q-axis current according to the third dq current setting. Thus, the controllable range of the motor within the range defined by the limited voltage can be expanded.

Furthermore, in the case where it is found that the second dq determination current is higher than the limited current as the result of the determination of whether or not the second dq determination current is equal to or lower than the limited current, the current command setting means having the magnitude of the dq-axis current is equal to the magnitude of the limited current, determines whether or not a fourth dq current setting, which is a combination of a d-axis current and a q-axis current that makes the dq induced voltage equal to the limited current, can be calculated, and designates the d-axis current according to the fourth dq current setting as a command value of the d-axis current and the q-axis current according to the fourth dq current setting as a command value of the q-axis current if it is determined that the fourth dq current setting can be calculated.

According to the present invention, under the operational condition of the motor that there is a limitation of the limited voltage, and the second determination current is higher than the limited current, the current command setting means sets a command value of the d-axis current and a command value of the q-axis current according to the fourth dq current setting. Thus, within the range of the limited current and the limited voltage, the controllable range of the motor can be expanded.

Furthermore, the motor is converted into an equivalent circuit having a d-axis armature on a d-axis extending in the direction of magnetic fluxes of the fields and a q-axis armature on a q-axis orthogonal to the d-axis, the energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current, as a first dq current setting based on the induced voltage constant of the motor according to the rotor phase difference, wherein the combination is among combinations of a d-axis current and a q-axis current that provide the torque according to the torque command, and the current command setting means estimates induced voltages produced in the d-axis armature and the q-axis armature when a d-axis current and a q-axis current according to the first dq current setting are supplied, respectively, based on the induced voltage constant of the motor according to the rotor phase difference and the number of revolutions of the motor, and the current command setting means calculates a fifth dq current setting, which is a combination of a d-axis current and a q-axis current that maximizes the torque of the motor for the induced voltage constant of the motor and makes the dq induced voltage equal to the limited voltage, if a third dq current setting, which is a combination of a d-axis current and a q-axis current that maximizes the torque of the motor, cannot be calculated in the case where a dq determination voltage, which is a vector sum of the estimated induced voltage produced in the d-axis armature and the estimated induced voltage produced in the q-axis armature, is higher than a limited voltage set according to the output voltage of the direct-current power supply, and a dq induced voltage, which is a vector sum of the induced voltage produced in the d-axis armature and the induced voltage produced in the q-axis armature, is equal to the limited voltage, and the current command setting means determines whether or not a third determination current having a magnitude equal to the magnitude of the dq-axis current according to the fifth dq current setting is equal to or lower than the limited current, and designates the d-axis current according to the fifth dq current setting as a command value of the d-axis current and the q-axis current according to the fifth dq current setting as a command value of the q-axis current if the third determination current is equal to or lower than the limited current.

According to the present invention, under the operational condition of the motor that there is a limitation of the limited voltage, and the third dq current setting that makes the magnitude of the dq current equal to or lower than the limited current when the dq induced voltage is equal to the limited voltage cannot be calculated, the current command setting means sets a command value of the d-axis current and a command value of the q-axis current according to the fifth dq current setting under the condition that the third determination current is equal to or lower than the limited current. Thus, the controllable range of the motor can be expanded according to the induced voltage constant of the motor within the limit of the limited voltage.

Furthermore, in the case where it is found that the third dq determination current is higher than the limited current as the result of the determination of whether or not the third dq determination current is equal to or lower than the limited current, the current command setting means determines whether or not a fourth dq current setting, which is a combination of a d-axis current and a q-axis current that makes the magnitude of the dq-axis current equal to the magnitude of the limited current and makes the dq induced voltage equal to the limited current, can be calculated, and designates the d-axis current according to the fourth dq current setting as a command value of the d-axis current and the q-axis current according to the fourth dq current setting as a command value of the q-axis current if it is determined that the fourth dq current setting can be calculated.

According to the present invention, under the operational condition of the motor that there is a limitation of the limited voltage, the third dq current setting that makes the magnitude of the dq current equal to or lower than the limited current when the dq induced voltage is equal to the limited voltage cannot be calculated, and the third determination current is higher than the limited current, the current command setting means sets a command value of the d-axis current and a command value of the q-axis current according to the fourth dq current setting. Thus, the controllable range of the motor can be expanded according to the induced voltage constant of the motor within the limitations by the limited voltage and the limited current.

BRIEF DESCRIPTION OF THE DRAWINGS

FIG. 22 is a diagram for illustrating the need of a field weakening control in driving and regeneration.

DETAILED DESCRIPTION OF THE PREFERRED EMBODIMENTS

Figure 1:
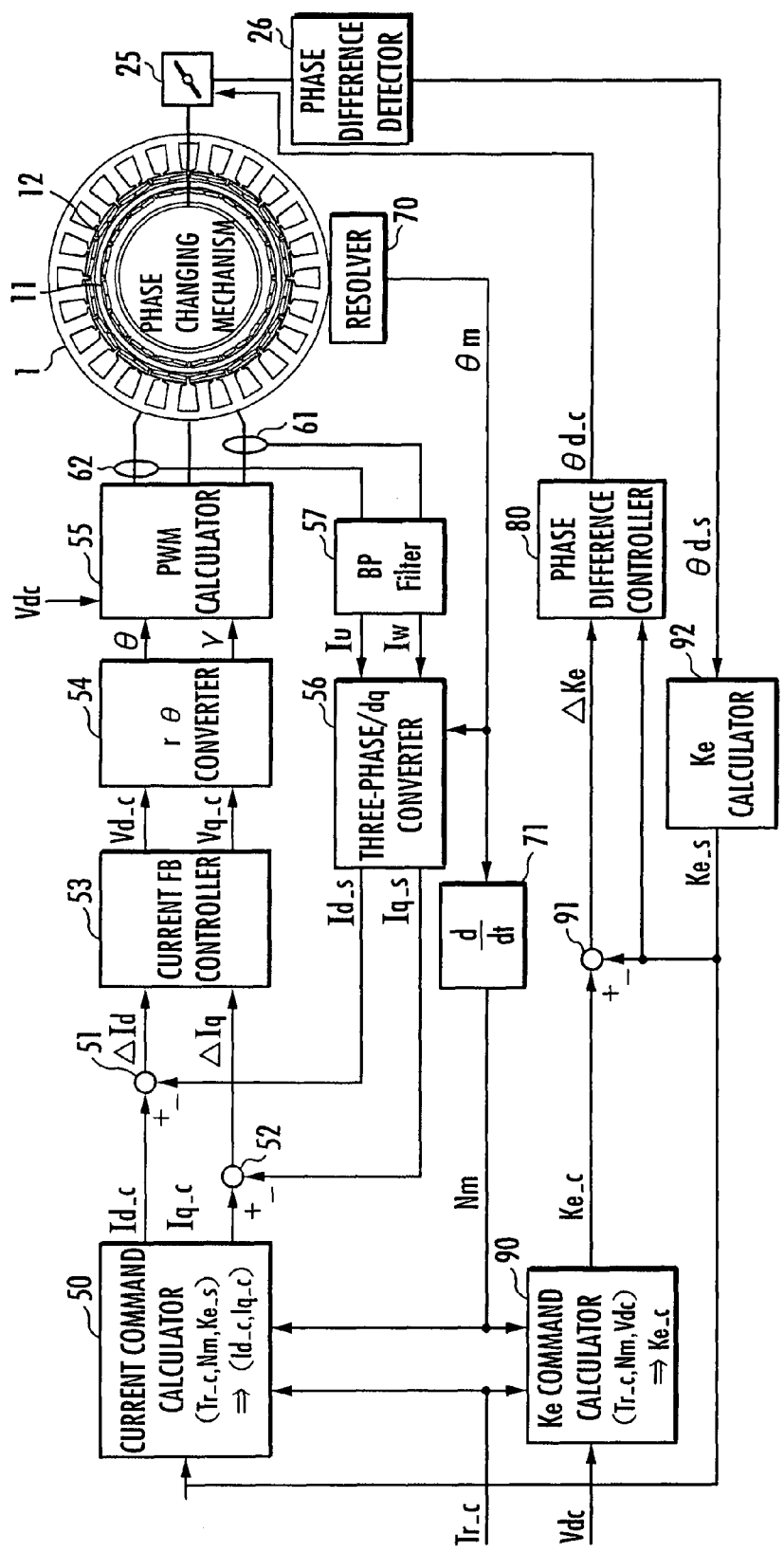
FIG. 1 is a control block diagram showing a controller for a motor according to the present invention.
Figure 2:
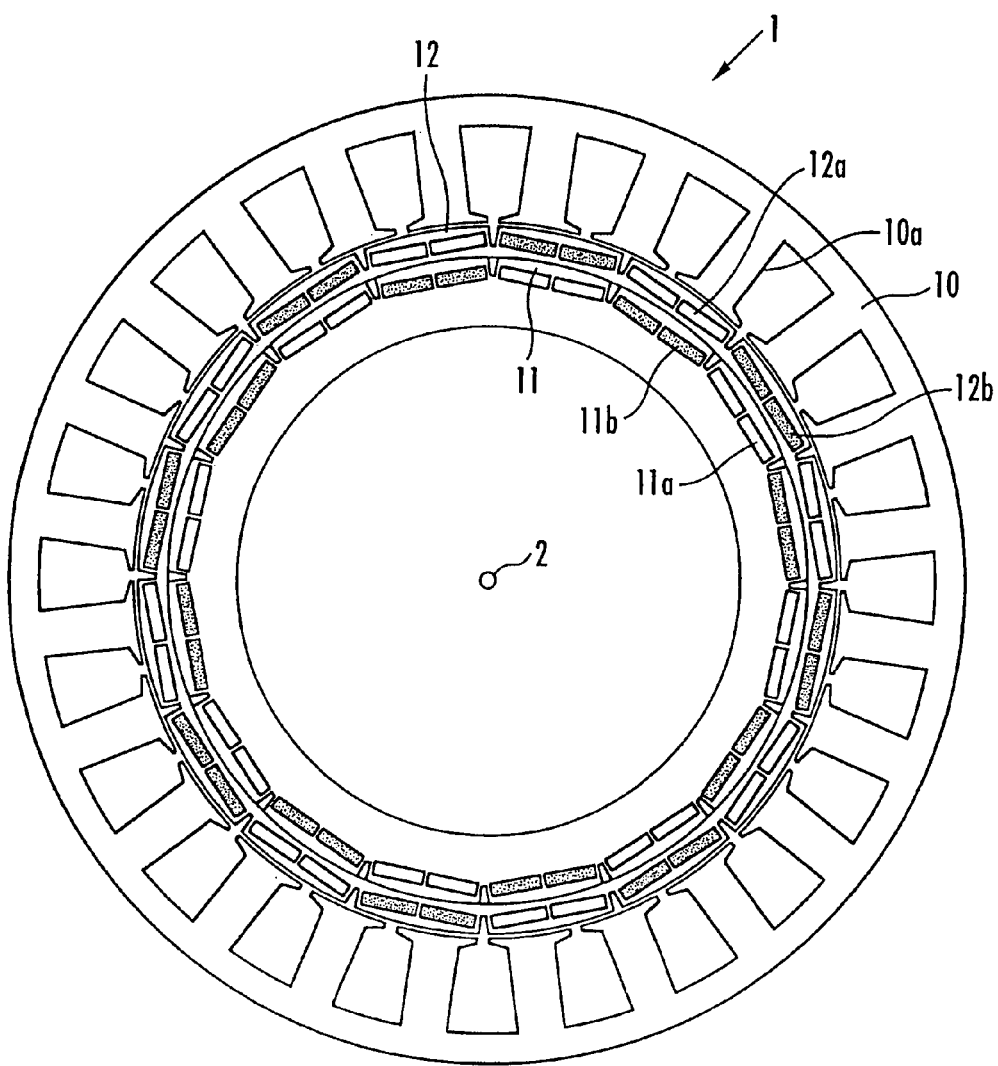
FIG. 2 is a diagram showing a configuration of the motor shown in FIG. 1, which is of double rotor type.
Figure 3:
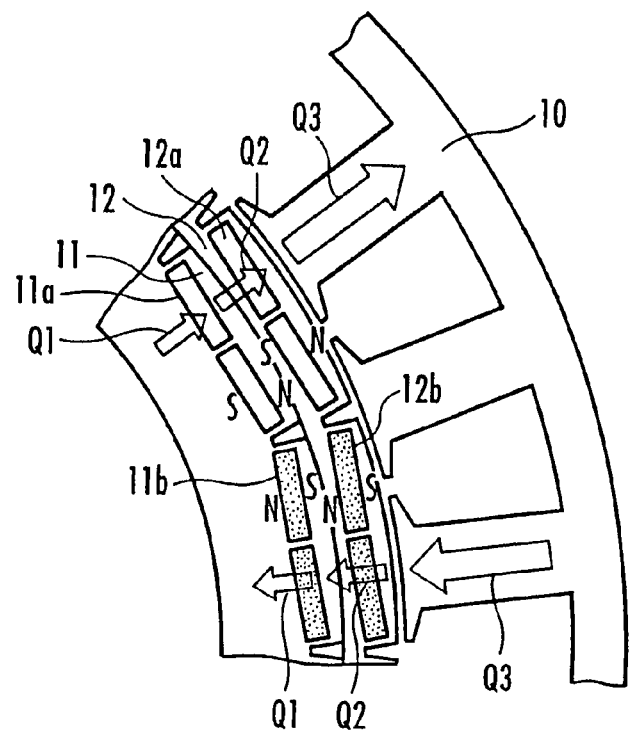
FIGS. 3($a$) and 3($b$) include diagrams for illustrating the effect of changing the phase difference between an outer rotor and an inner rotor.
Figure 3:
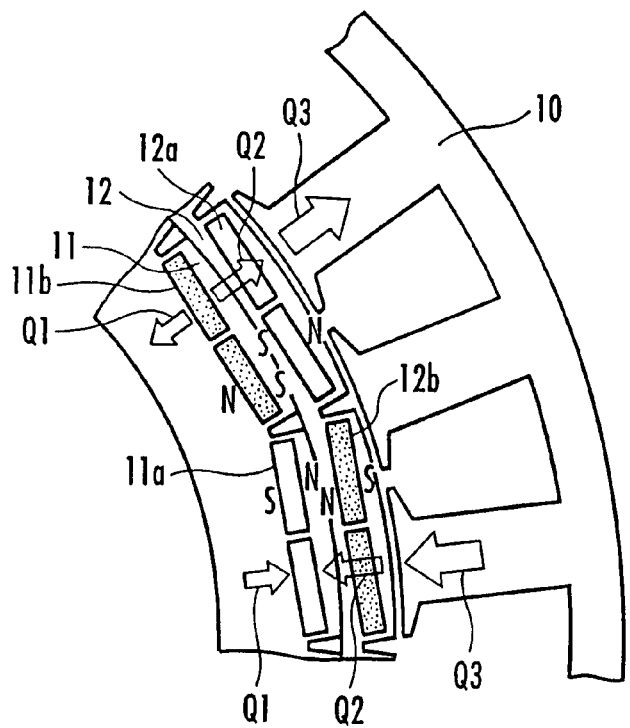
Figure 4:
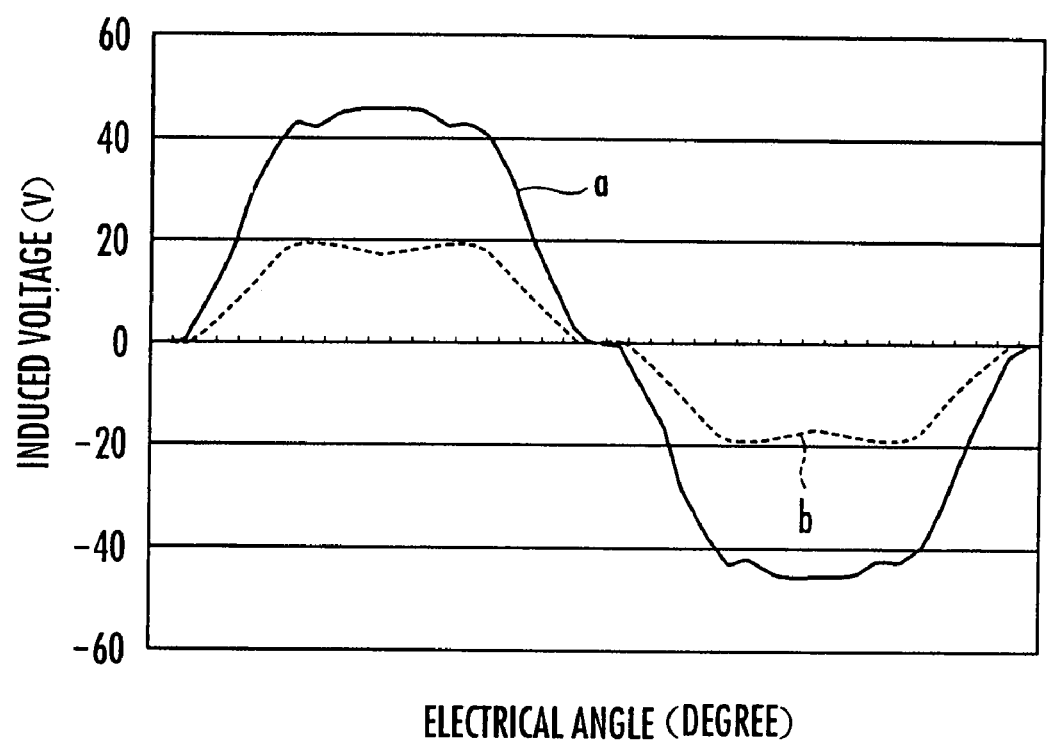
FIG. 4 is a graph for illustrating the effect of changing the phase difference between an outer rotor and an inner rotor.
Figure 5:
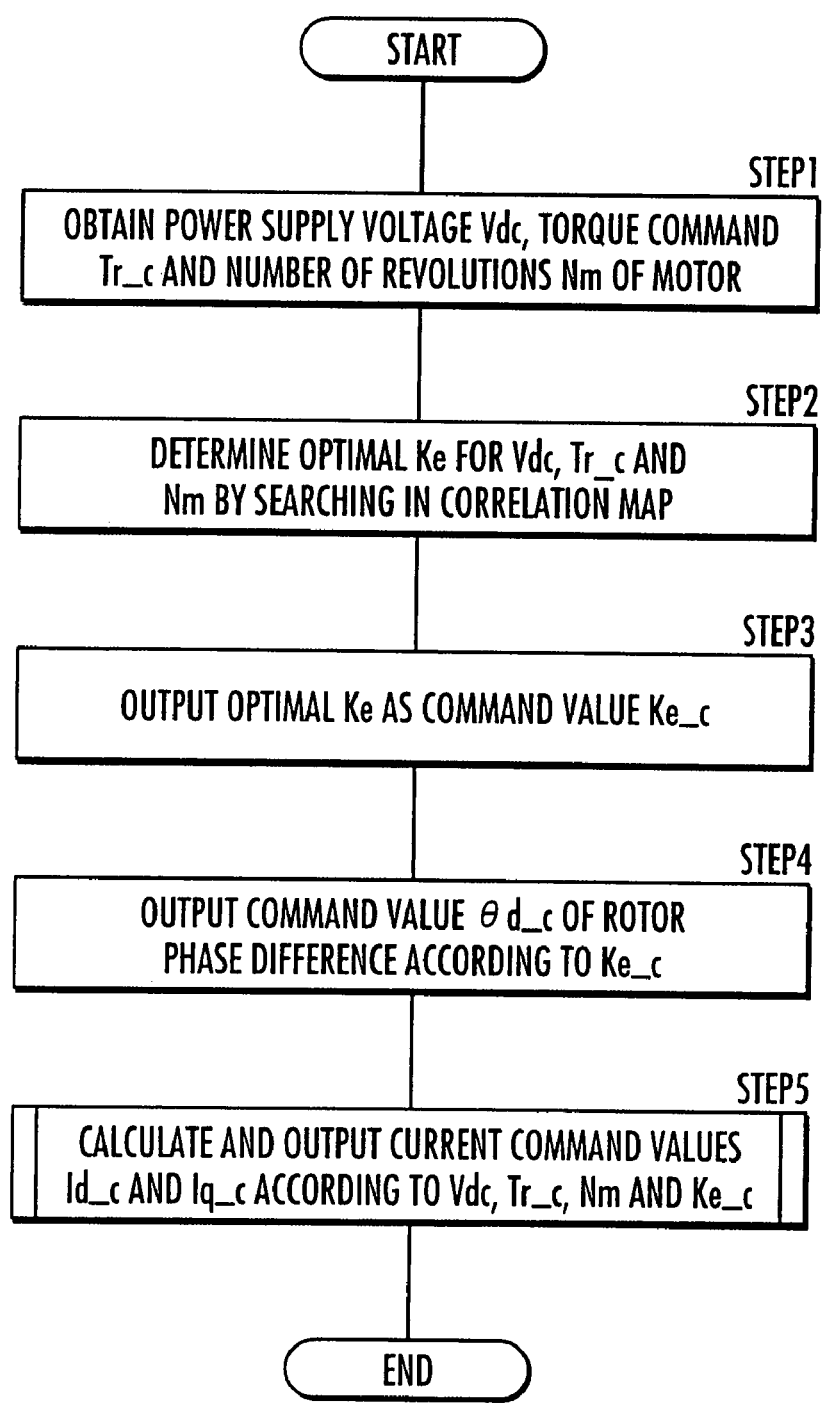
FIG. 5 is a flowchart illustrating an entire operation of the controller for the motor.
Figure 6:
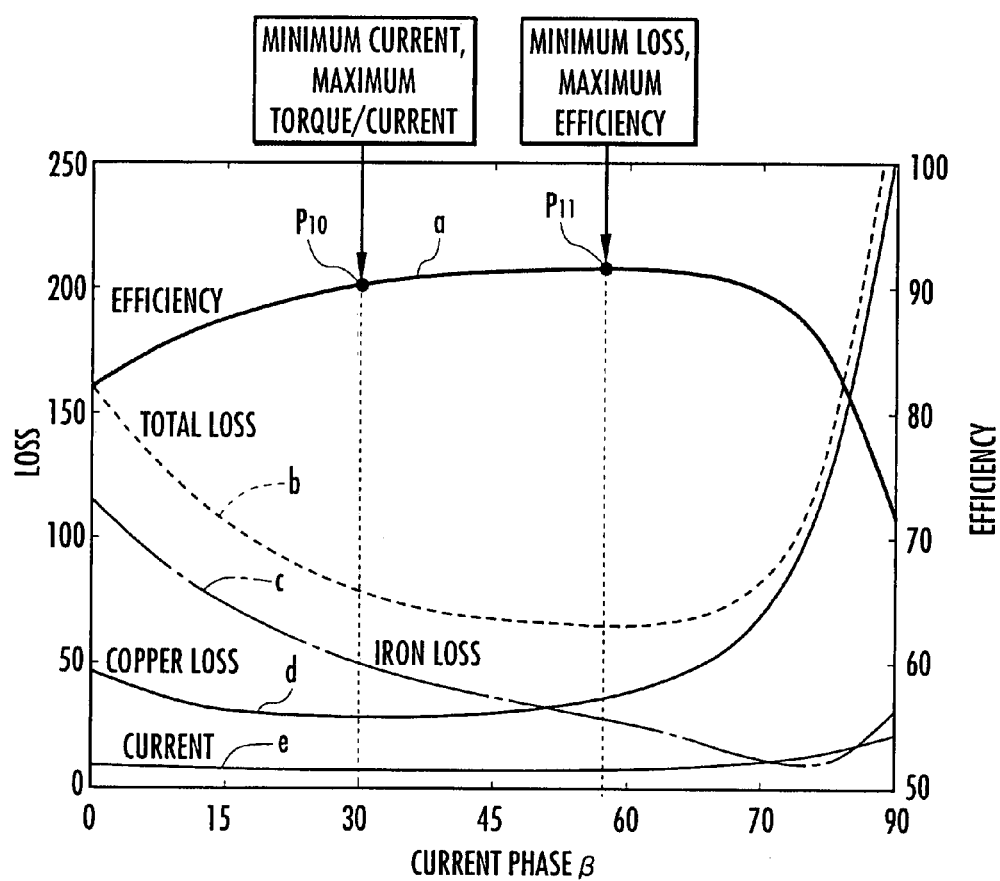
FIG. 6 is a diagram for illustrating the effect of expansion of a controllable range of the motor by changing the rotor phase difference.
Figure 7:
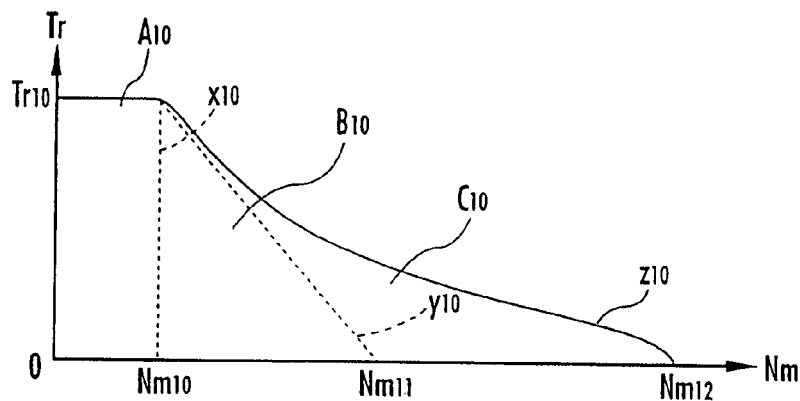
FIGS. 7($a$) and 7($b$) include diagrams for illustrating the effect of expansion of a controllable range of the motor by changing the rotor phase difference.
Figure 7:
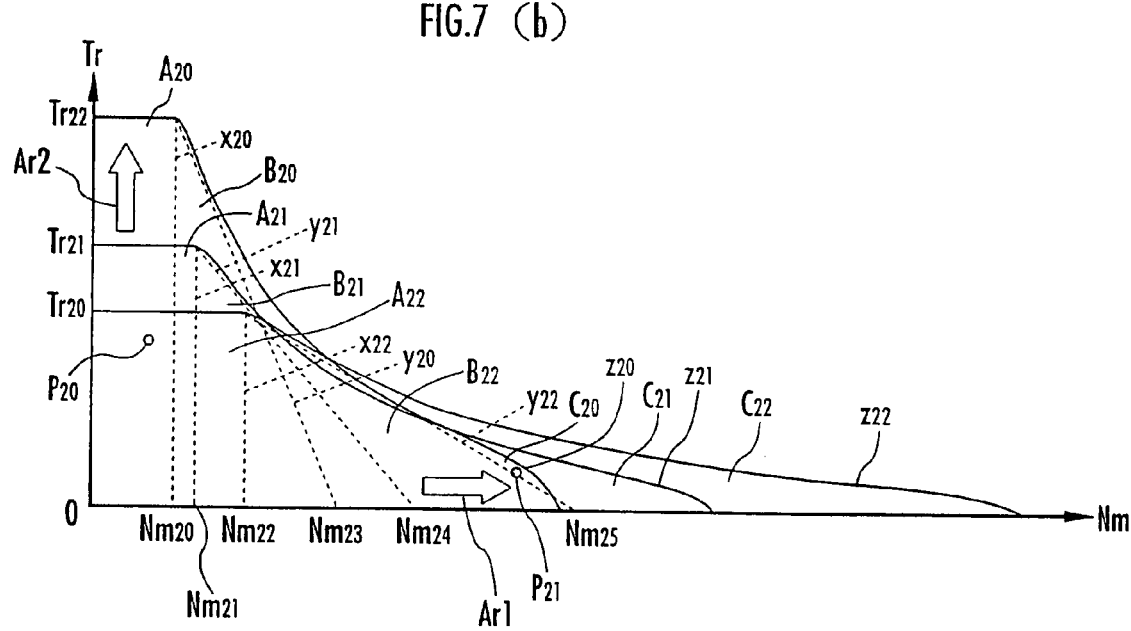
Figure 8:
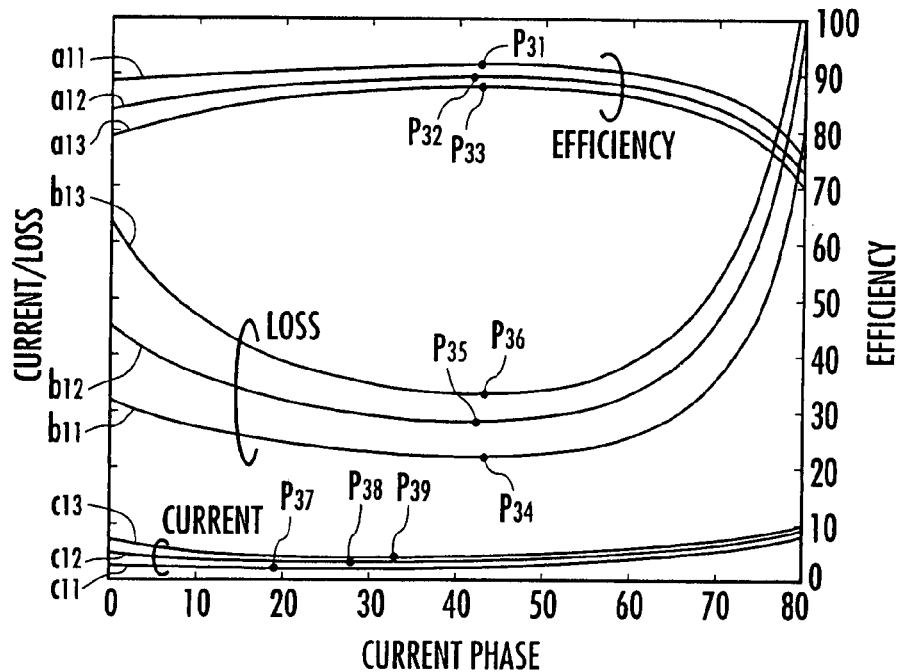
FIGS. 8($a$) and 8($b$) include diagrams for illustrating the effect of expansion of a controllable range of the motor by changing the rotor phase difference.
Figure 8:
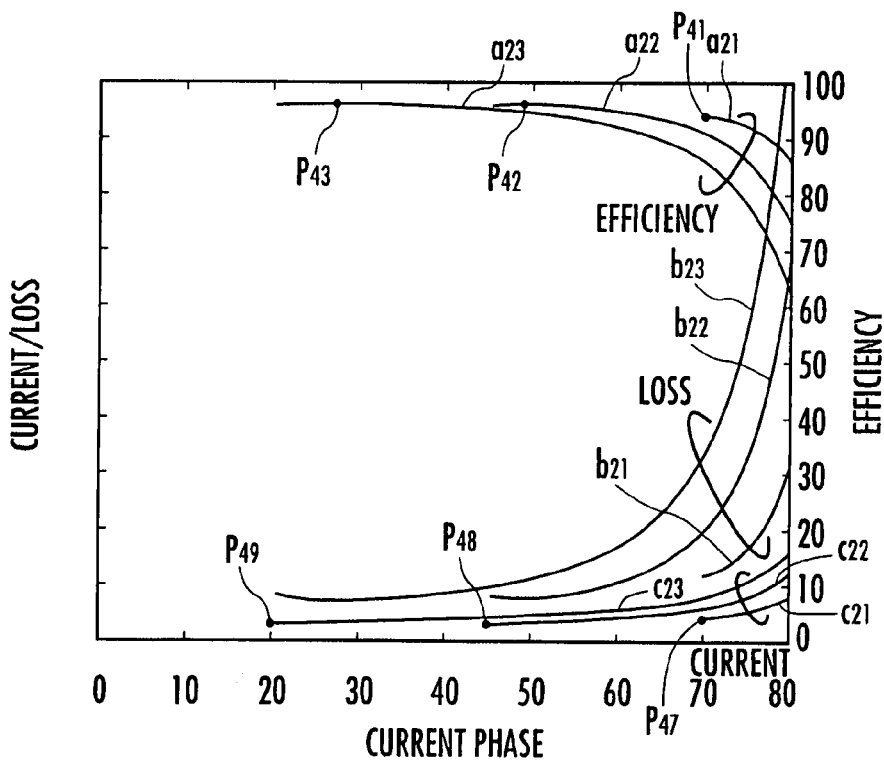
Figure 9:
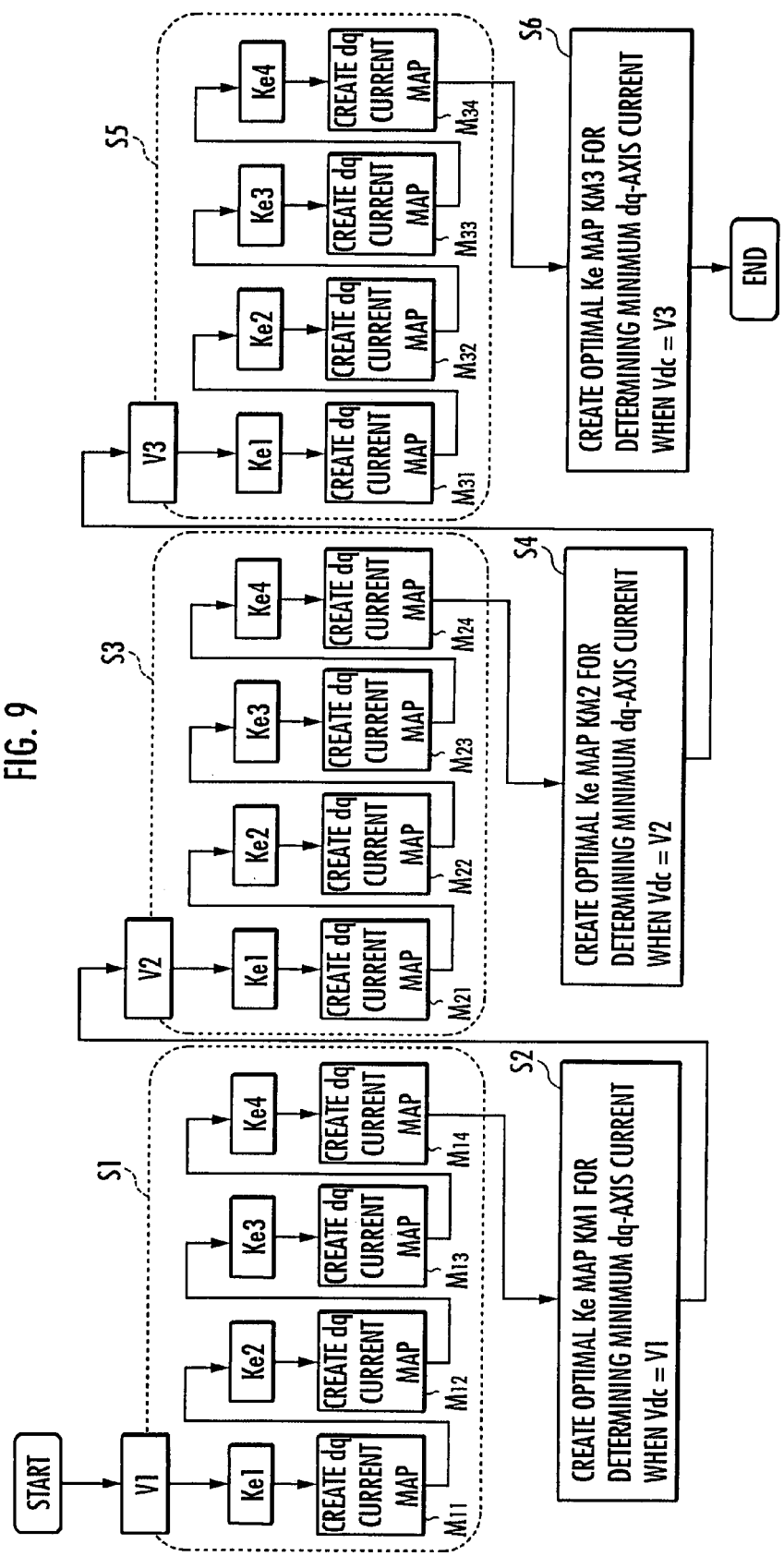
FIG. 9 is a diagram for illustrating a procedure of creating a map for determining an optimal induced voltage constant.
Figure 10:
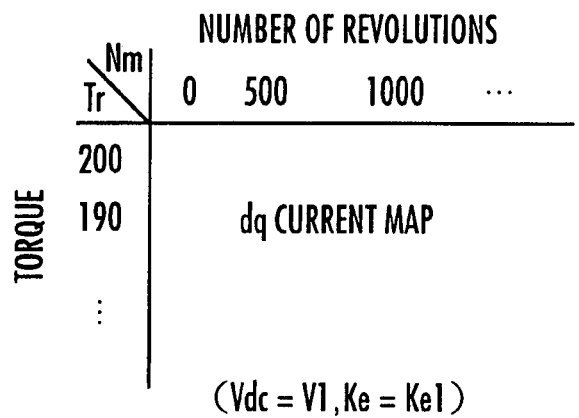
FIGS. 10($a$) and 10($b$) include diagrams for illustrating the procedure of creating a map for determining an optimal induced voltage constant.
Figure 10:
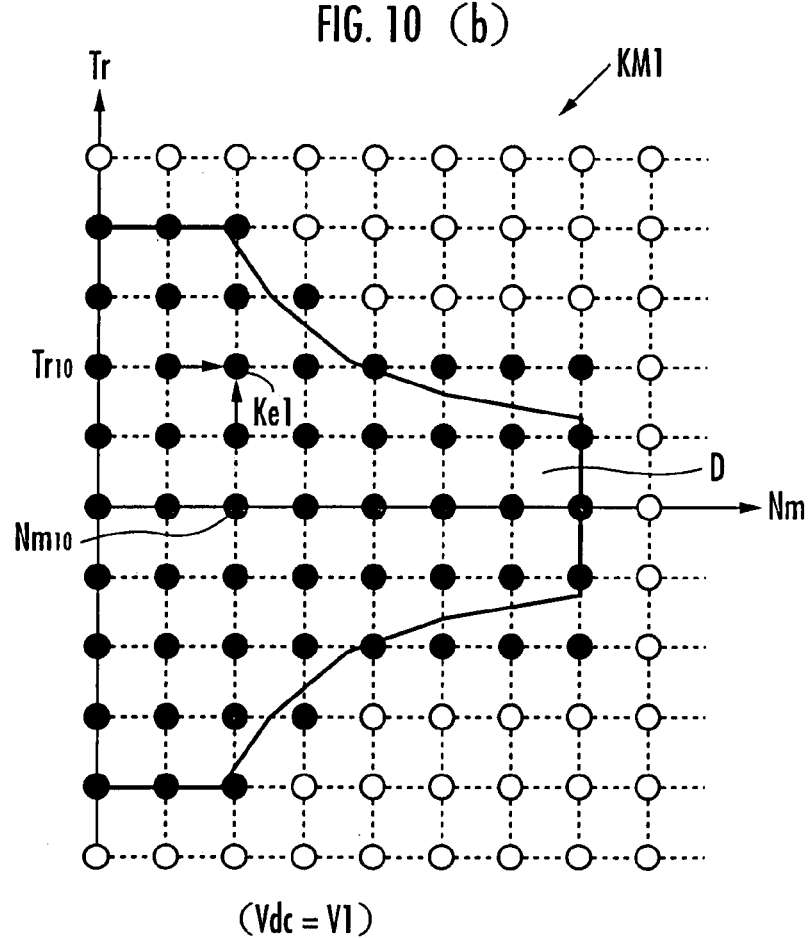
Figure 11:
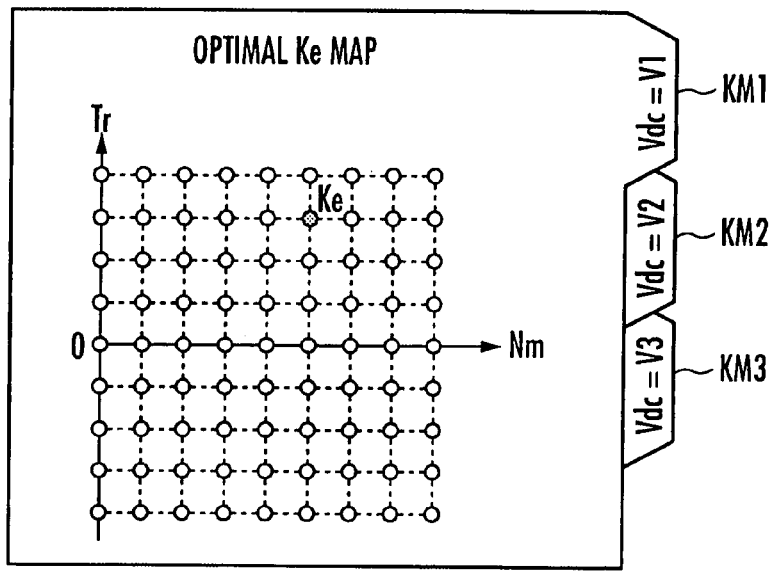
FIGS. 11($a$) and 11($b$) include diagrams for illustrating the procedure of creating a map for determining an optimal induced voltage constant.
Figure 11:
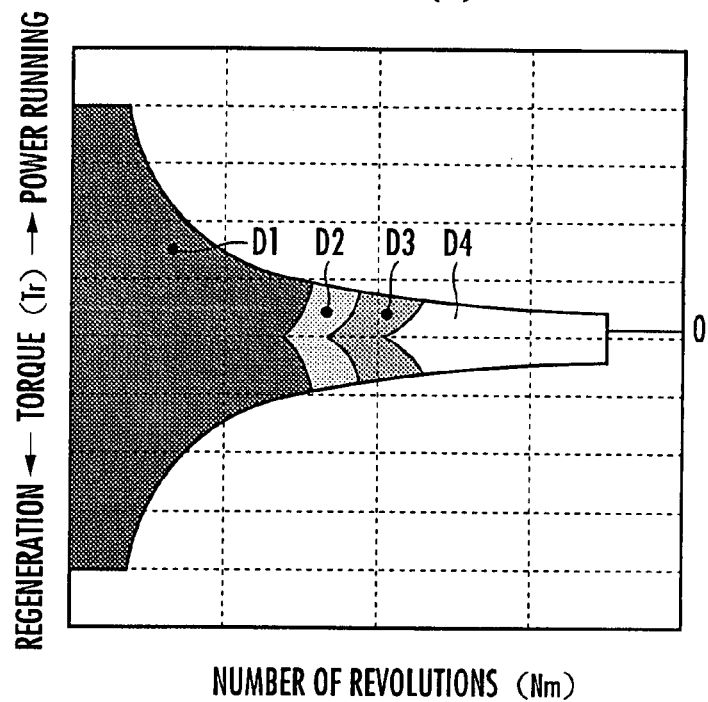
Figure 12:
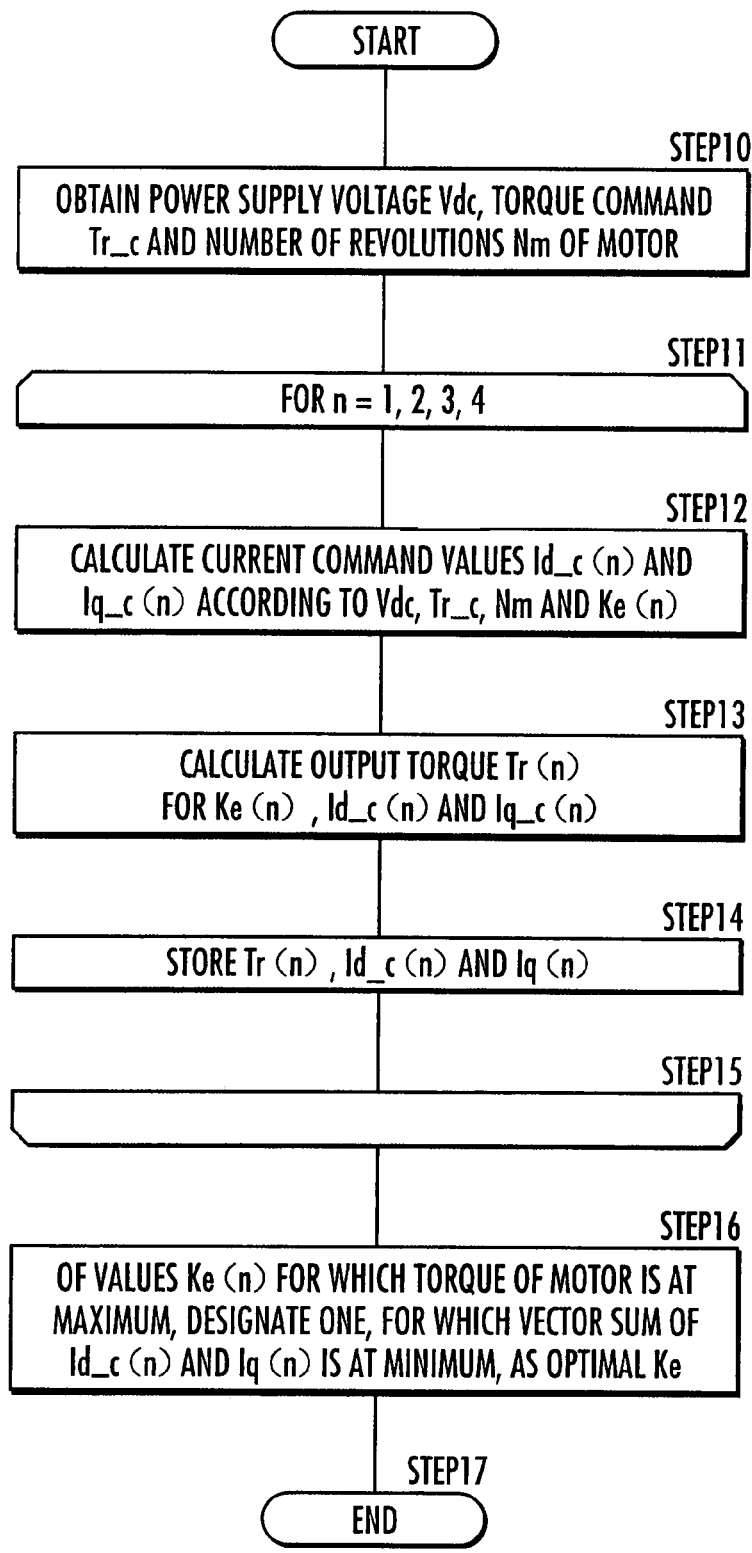
FIG. 12 is a flowchart of a process of calculating the optimal induced voltage constant.
Figure 13:
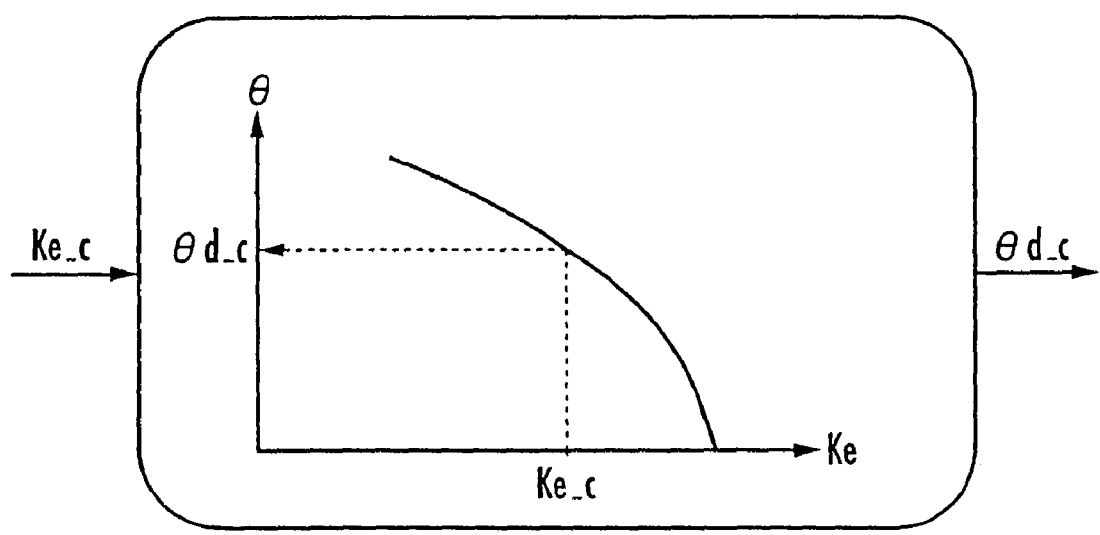
FIG. 13 is a diagram illustrating a map for converting an induced voltage constant into a rotor phase difference.
Figure 19:
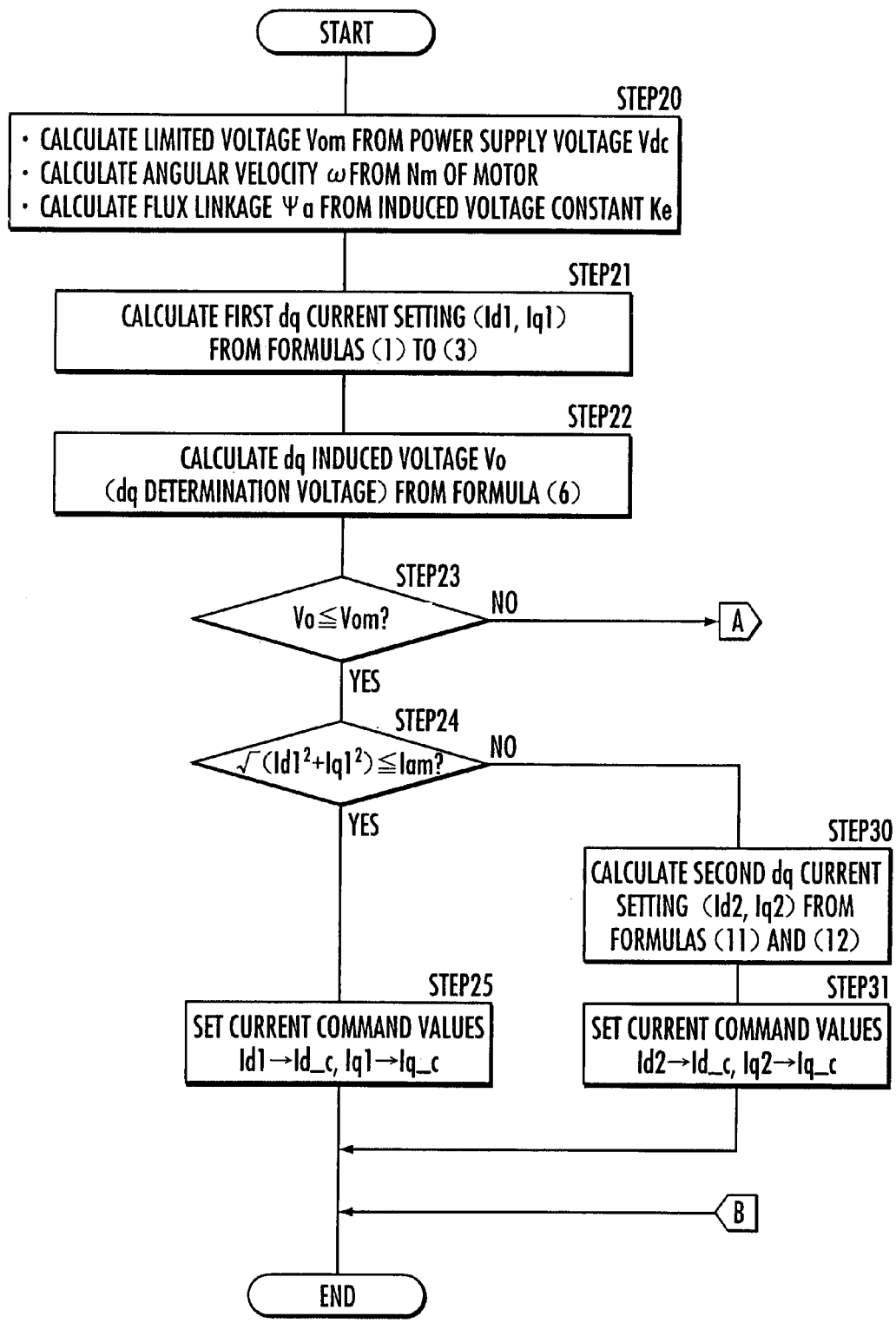
FIG. 19 is a flowchart illustrating a process of setting an optimal current command value.
Figure 20:
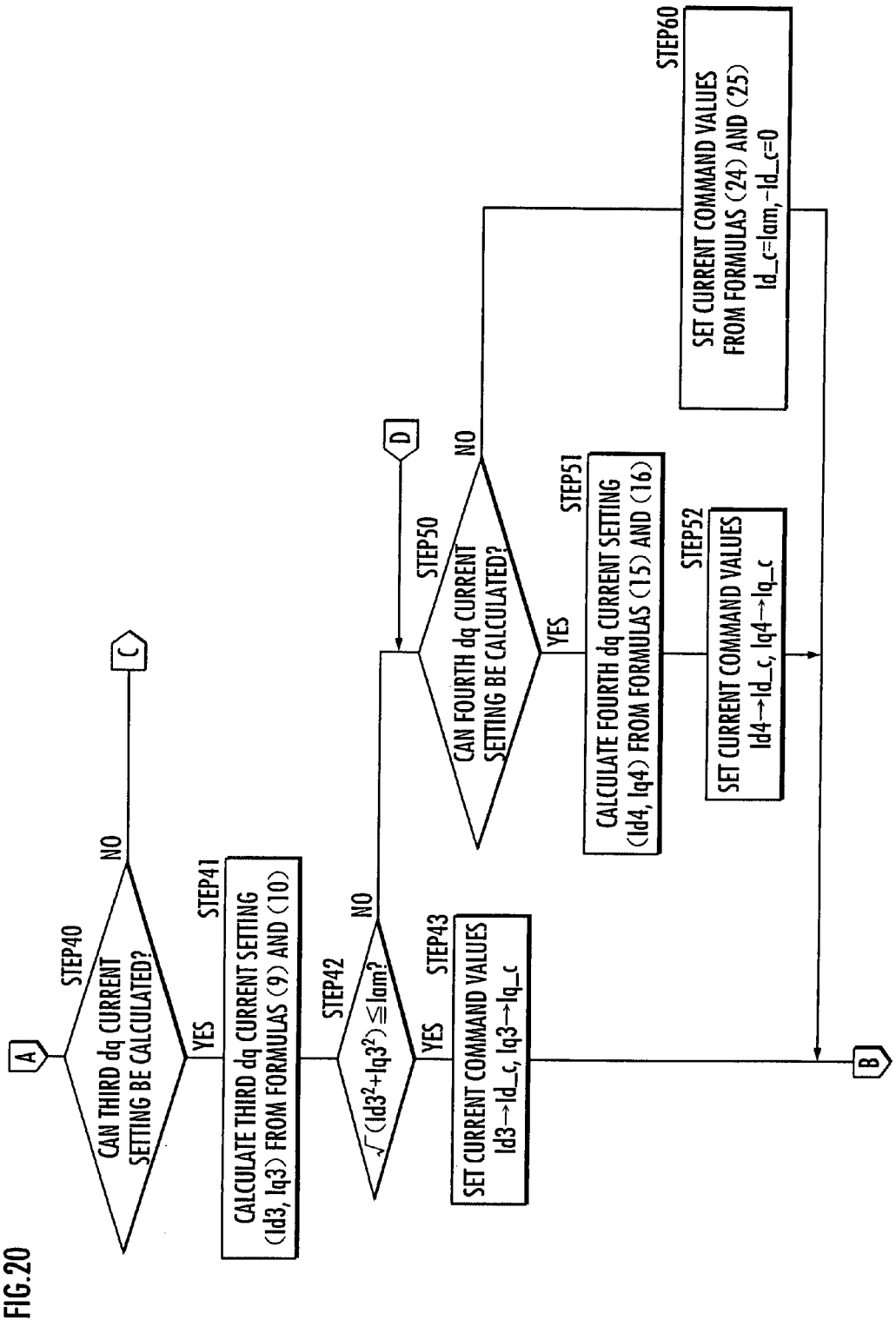
FIG. 20 is a flowchart illustrating the process of setting an optimal current command value.
Figure 21:
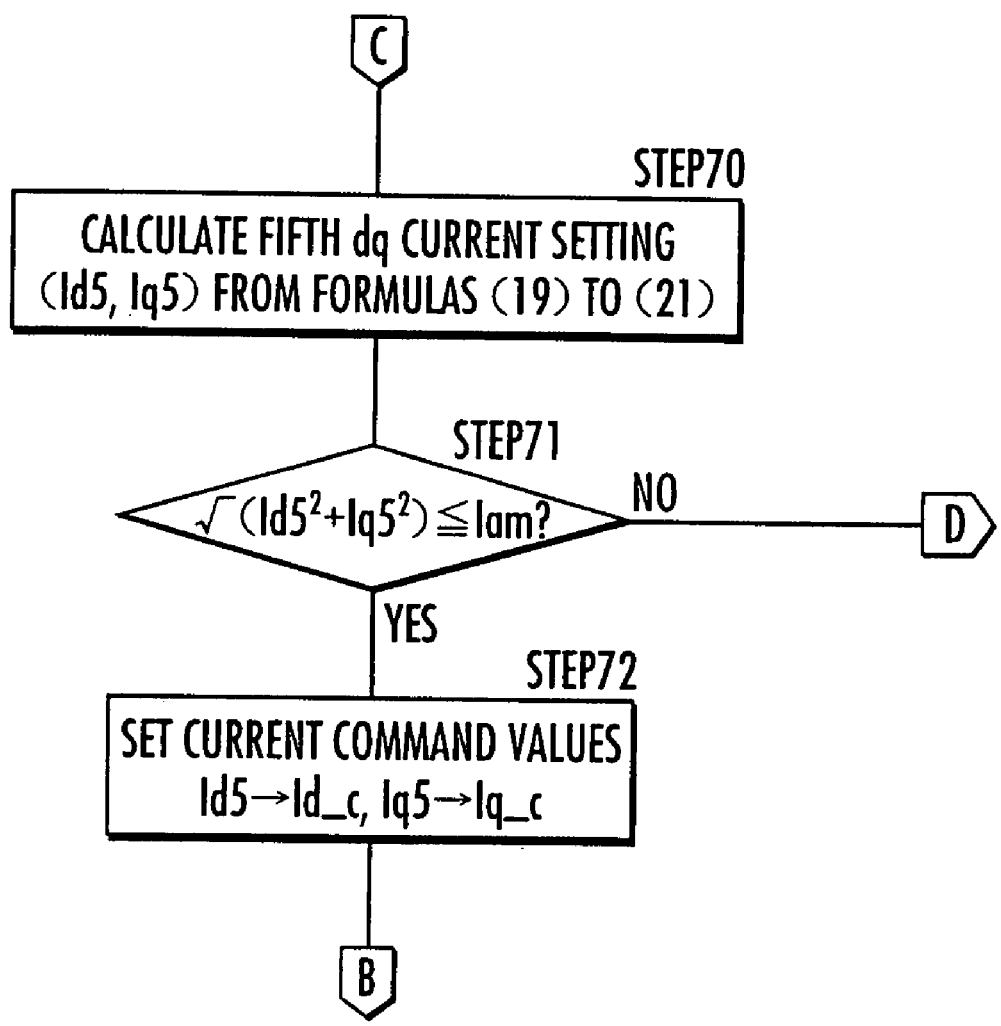
FIG. 21 is a flowchart illustrating the process of setting an optimal current command value.

An embodiment of the present invention will be described with reference to FIGS. 1 to 21. FIG. 1 is a control block diagram showing a controller for a motor according to the present invention. FIG. 2 is a diagram showing a configuration of the motor shown in FIG. 1, which is of double rotor type. FIGS. 3 and 4 are diagrams for illustrating the effect of changing the phase difference between an outer rotor and an inner rotor. FIG. 5 is a flowchart illustrating an entire operation of the controller for the motor. FIGS. 6 to 8 are diagrams for illustrating the effect of expansion of a controllable range of the motor by changing the rotor phase difference. FIGS. 9 to 11 are diagrams for illustrating a procedure of creating a map for determining an optimal induced voltage constant. FIG. 12 is a flowchart of a process of calculating the optimal induced voltage constant. FIG. 13 is a diagram illustrating a map for converting an induced voltage constant into a rotor phase difference. FIGS. 14 to 18 are diagrams for illustrating a method of determining an optimal current command value. FIGS. 19 to 21 are flowcharts illustrating a process of setting the optimal current command value.

Referring to FIG. 1, a controller for a motor (referred to as motor controller hereinafter) according to the present invention is intended to control the operation of a motor 1, which is a DC brushless motor with two rotors. First, referring to FIGS. 2 to 4, a configuration of the motor 1 will be described.

As shown in FIG. 2, the motor 1 is a DC brushless motor comprising an inner rotor 11 having fields constituted by permanent magnets 11a and 11b disposed at regular intervals along the circumference thereof, an outer rotor 12 having fields constituted by permanent magnets 12a and 12b disposed at regular intervals along the circumference thereof, and a stator 10 having an armature 10a for producing a rotating magnetic field with respect to the inner rotor 11 and the outer rotor 12. One of the inner rotor 11 and the outer rotor 12 corresponds to a first rotor according to the present invention, and the other corresponds to a second rotor according to the present invention.

The inner rotor 11 and the outer rotor 12 are concentrically disposed so that the rotors rotate about a rotating shaft 2 of the motor 1. On the inner rotor 11, the permanent magnets 11a having their respective S poles oriented toward the rotating shaft 2 and the permanent magnets 11b having their respective N poles oriented toward the rotating shaft 2 are alternately disposed. Similarly, on the outer rotor 12, the permanent magnets 12a having their respective S poles oriented toward the rotating shaft 2 and the permanent magnets 12b having their respective N poles oriented toward the rotating shaft 2 are alternately disposed.

The motor 1 further comprises a relative rotation mechanism (not shown), such as a planetary gear mechanism, for changing the rotor phase difference, which is the phase difference between the outer rotor 12 and the inner rotor 11. The rotor phase difference can be changed by operating the relative rotation mechanism by means of an actuator 25 (see FIG. 1). The actuator 25 may be a motor or a hydraulic device, for example. The relative rotation mechanism and the actuator 25 constitute rotor phase difference changing means according to the present invention.

The phase difference between the outer rotor 12 and the inner rotor 11 can be changed at least by 180 degrees in the advance or lag direction in terms of electrical angle. The state of the motor 1 can be appropriately set between a field-weakened state in which the permanent magnets 12a and 12b on the outer rotor 12 and the permanent magnets 11a and 11b on the inner rotor 11 face each other with the like poles facing each other and a field-strengthened state in which the permanent magnets 12a and 12b on the outer rotor 12 and the permanent magnets 11a and 11b on the inner rotor 11 face each other with the opposite poles facing each other.

FIG. 3(a) shows the field-strengthened state, in which the directions of magnetic fluxes Q2 of the permanent magnets 12a and 12b on the outer rotor 12 are the same as the directions of magnetic fluxes Q1 of the permanent magnets 11a and 11b on the inner rotor 11, respectively, and therefore, increased composite magnetic fluxes Q3 result. On the other hand, FIG. 3(b) shows the field-weakened state, in which the directions of the magnetic fluxes Q2 of the permanent magnets 12a and 12b on the outer rotor 12 are opposite to the directions of the magnetic fluxes Q1 of the permanent magnets 11a and 11b on the inner rotor 11, respectively, and therefore, decreased composite magnetic fluxes Q3 result.

FIG. 4 shows graphs, for comparison, of an induced voltage produced in the armature of the stator 10 when the motor 1 operates at a predetermined number of revolutions in the states shown in FIGS. 3(a) and 3(b). In this drawing, the axis of ordinates indicates the induced voltage (V), and the axis of abscissas indicates the electrical angle (degree). In this drawing, reference character "a" represents the state shown in FIG. 3(a) (field-strengthened state), and reference character "b" represents the state shown in FIG. 3(b) (field-weakened state). As can be seen from FIG. 4, the level of the induced voltage produced significantly changes as the phase difference between the outer rotor 12 and the inner rotor 11 changes.

An induced voltage constant Ke of the motor 1 can be changed by increasing or decreasing the magnetic fluxes of the fields by changing the phase difference between the outer rotor 12 and the inner rotor 11. Thus, compared with a case where the induced voltage constant Ke is constant, the motor 1 can operate with wide ranges of output power and number of revolutions. Furthermore, compared with a case where the field weakening control is conducted by energizing an armature on a d-axis (field axis) by dq coordinate conversion, the loss of the motor 1 is reduced, and thus the operational efficiency of the motor 1 is enhanced.

In the following, with reference to FIG. 1, a configuration of the motor controller will be described. The motor controller converts the motor 1 into an equivalent circuit based on a two-phase direct-current rotating coordinate system in which the direction of field is indicated by a d-axis, and the direction orthogonal to the d-axis is indicated by a q-axis and controls the amount of energization of the motor 1 so that the motor 1 outputs a torque according to a torque command Tr_c externally supplied.

The motor controller is an electronic unit composed of a CPU, a memory and the like. The motor controller comprises a current command calculator 50 (which corresponds to current command setting means according to the present invention) that calculates a command value Id_c of a current (referred to as d-axis current hereinafter) flowing through an armature on the d-axis (referred to as d-axis armature hereinafter) and a command value Iq_c of a current (referred to as q-axis current hereinafter) flowing through an armature on the q-axis (referred to as q-axis armature hereinafter) based on the torque command Tr_c, the number of revolutions Nm of the motor 1 and a calculated value Ke_s of the induced voltage constant of the motor 1, and a three-phase/dq converter 56 that calculates a detection value Id_s of the d-axis current and a detection value Iq_s of the q-axis current by three-phase/dq conversion based on a current detection signal obtained by current sensors 61 and 62 from which an unwanted component has been removed by a band pass filter (BP) 57 and a rotor angle θm of the outer rotor 12 detected by a resolver 70.

Furthermore, the motor controller comprises a subtracter 51 that calculates the difference ΔId between the command value Id_c and the detection value Id_s of the d-axis current, a subtracter 52 that calculates the difference ΔIq between the command value Iq_c and the detection value Iq_s of the q-axis current, a current feedback (FB) controller 53 that determines a command value Vd_c of a voltage applied to the d-axis armature (referred to as d-axis voltage hereinafter) and a command value Vq_c of a voltage applied to the q-axis armature (referred to as q-axis voltage hereinafter) based on the differences ΔId and ΔIq, an rθ converter 54 that converts the voltages Vd_c and Vq_c into an angle θ and a magnitude r, and a PWM calculator 55 (including the function of an inverter according to the present invention) that produces a three-phase AC voltage responsive to the angle θ and the magnitude r from a direct-current voltage Vdc and outputs the three-phase AC voltage to the motor 1.

The subtracter 51, the subtracter 52, the current FB controller 53, the rθ converter 54, the BP filter 57 and the three-phase/dq converter 56 constitute energization controlling means according to the present invention.

Furthermore, the motor controller comprises a differentiator 71 (which corresponds to number-of-revolutions detecting means according to the present invention) that differentiates the rotor angle θm of the motor 1 detected by the resolver 70 and outputs the number of revolutions Nm of the motor 1, a Ke command value calculator 90 that calculates a command value Ke_c of an optimal induced voltage constant based on the torque command Tr_c, the output voltage Vdc of a direct-current power supply (not shown) and the number of revolutions Nm of the motor, a Ke calculator 92 that calculates an induced voltage constant Ke_s according to a detection value θd_s of the rotor phase difference obtained by a phase difference detector 26, a subtracter 91 that calculates the difference ΔKe between the values Ke_c and Ke_s, and a phase difference controller 80 that calculates a command value θd_c of the rotor phase difference from the values Ke_s and ΔKe and outputs the command value θd_c to the actuator 25. The Ke command value calculator 90, the subtracter 91, the Ke calculator 92, the phase difference controller 80 and the phase difference detector 26 constitute rotor phase difference controlling means according to the present invention.

Now, with reference to the flowchart of FIG. 5, a process of calculating the command value Ke_c of the optimal induced voltage constant by the Ke command calculator 90 and a process of calculating the d-axis command value Id_c and the q-axis current command value Iq_c by the current command calculator 50 will be described.

STEPS 1 to 3 in FIG. 5 are processings carried out by the Ke command calculator 90. In STEP 1, the Ke command calculator 90 obtains the output voltage Vdc of the direct-current power supply, the torque command Tr_c and the number of revolutions Nm of the motor 1. Then, in the following STEP 2, a correlation map for determining an optimal induced voltage constant for the values Vdc, Tr_c and Nm, which is previously stored in a memory (not shown), is applied to the set of values (Vdc, Tr_c, Nm) obtained in STEP 1, thereby determining a value Ke as the command value Ke_c of the induced voltage constant.

FIG. 6 shows changes in efficiency, total loss, iron loss, copper loss and dq-axis current, which is a vector sum of the d-axis current and the q-axis current, in a case where the output torque of the motor 1 is constant in a region of the number of revolutions equal to or less than a basic number of revolutions at which a dq induced voltage $V_0$, which is a vector sum of the induced voltage produced in the d-axis armature and the induced voltage produced in the q-axis armature of the motor 1, is equal to a limited voltage $V_{0m}$ (which is set close to an upper limit of a dq voltage (a vector sum of the d-axis voltage and the q-axis voltage) that can be output from the PWM calculator 55). In this drawing, the left-hand axis of ordinates indicates the losses, the right-hand axis of ordinates indicates the efficiency, and the axis of abscissas indicates the phase β between the d-axis current and the q-axis current.

In this drawing, reference character "a" denotes a change in magnitude of the efficiency, reference character "b" denotes a change in magnitude of the total loss, reference character "c" denotes a change in magnitude of the iron loss, reference character "d" denotes a change in magnitude of the copper loss, and reference character "e" denotes a change in magnitude of the dq-axis current. In FIG. 6, a point $P_{10}$ is a point at which the magnitude of the dq-axis current required to achieve the constant torque is minimized (the magnitude of torque/dq-axis current is maximized), a point $P_{11}$ is a point at which the loss that occurs when achieving the constant torque is minimized (the efficiency is maximized).

As shown in FIG. 6, in the region where the number of revolutions is equal to or less than the basic number of revolutions, the phase between the d-axis current and the q-axis current (current phase) β differs between a "torque/current maximizing control" for minimizing the magnitude of the dq-axis current when achieving the constant torque and a "efficiency maximizing control" for maximizing the efficiency in achieving the constant torque. In general, in the "efficiency maximizing control", the magnitude of the dq-axis current required to achieve the constant torque is larger than in the "torque/current maximizing control", because the current is advanced, and the current is consumed for decreasing the iron loss. Therefore, in the case where the dq-axis current that can be supplied is limited, a larger torque can be produced by the "torque/current maximizing control" rather than the "efficiency maximizing control".

The region in which the "torque/current maximizing control" can be conduced can be expanded by the Ke command calculator 90 appropriately changing the induced voltage constant Ke of the motor 1 according to the torque command Tr_c, the number of revolutions Nm of the motor 1, and the output voltage Vdc of the direct-current power supply.

FIG. 7(a) shows a relationship between the torque and the number of revolutions of the motor 1 in a case where a moderate induced voltage constant Ke is set. In this drawing, the axis of ordinates indicates the torque (Tr), and the axis of abscissas indicates the number of revolutions (Nm). FIG. 7(b) shows relationships between the torque and the number of revolutions of the motor 1 in a case where the induced voltage constant Ke is switched among a maximum value, a moderate value and a minimum value. In this drawing, as in FIG. 7(a), the axis of ordinates indicates the torque (Tr), and the axis of abscissas indicates the number of revolutions (Nm).

In FIG. 7(a), the region $A_{10}+B_{10}$ (a region defined by the line $Tr=Tr_{10}$, the boundary $y_{10}$, the Tr axis and the Nm axis) represents a controllable range of the motor 1 where the motor 1 can be controlled by the "torque/current maximizing control". The region $A_{10}$ (a region defined by the line $Tr=Tr_{10}$, the boundary $x_{10}$, the Tr axis and the Nm axis) represents a region where the torque is limited by current limitation.

The region $B_{10}$ (a region defined by the boundary $x_{10}$, the boundary $y_{10}$ and the Nm axis) represents a region where the torque is limited by voltage limitation. The region $A_{10}+B_{10}+C_{10}$ (a region defined by the line $Tr=Tr_{10}$, the boundary $z_{10}$, the Tr axis and the Nm axis) represents a controllable range where an "output maximizing control" (a control for expanding the operation range of the motor by applying a field weakening current) is possible.

In FIG. 7(b), the region $A_{20}+B_{20}$ (a region defined by the line $Tr=Tr_{22}$, the boundary $y_{20}$, the Tr axis and the Nm axis) represents a controllable range of the motor 1 where the motor 1 can be controlled by the "torque/current maximizing control" in the case where the maximum induced voltage constant Ke is set. The region $A_{20}$ (a region defined by the line $Tr=Tr_{22}$, the boundary $x_{20}$, the Tr axis and the Nm axis) represents a region where the torque is limited by current limitation. The region $B_{20}$ (a region defined by the boundary $x_{20}$, the boundary $Y_{20}$ and the Nm axis) represents a region where the torque is limited by voltage limitation. The region $A_{20}+B_{20}+C_{20}$ (a region defined by the line $Tr=Tr_{22}$, the boundary $z_{20}$, the Tr axis and the Nm axis) represents a controllable range where the "output maximizing control" is possible in the case where the maximum induced voltage constant Ke is set.

The region $A_{21}+B_{21}$ (a region defined by the line $Tr=Tr_{21}$, the boundary $y_{21}$, the Tr axis and the Nm axis) represents a controllable range of the motor 1 where the motor 1 can be controlled by the "torque/current maximizing control" in the case where the moderate induced voltage constant Ke is set. The region $A_{21}$ (a region defined by the line $Tr=Tr_{21}$, the boundary $x_{21}$, the Tr axis and the Nm axis) represents a region where the torque is limited by current limitation. The region $B_{21}$ (a region defined by the boundary $x_{21}$, the boundary $y_{21}$ and the Nm axis) represents a region where the torque is limited by voltage limitation. The region $A_{21}+B_{21}+C_{21}$ (a region defined by the line $Tr=Tr_{21}$, the boundary $z_{21}$, the Tr axis and the Nm axis) represents a controllable range where the "output maximizing control" is possible in the case where the moderate induced voltage constant Ke is set.

The region $A_{22}+B_{22}$ (a region defined by the line $Tr=Tr_{20}$, the boundary $y_{22}$, the Tr axis and the Nm axis) represents a controllable range of the motor 1 where the motor 1 can be controlled by the "torque/current maximizing control" in the case where the minimum induced voltage constant Ke is set. The region $A_{22}$ (a region defined by the line $Tr=Tr_{20}$, the boundary $x_{22}$, the Tr axis and the Nm axis) represents a region where the torque is limited by current limitation. The region $B_{22}$ (a region defined by the boundary $x_{22}$, the boundary $y_{22}$ and the Nm axis) represents a region where the torque is limited by voltage limitation. The region $A_{22}+B_{22}+C_{22}$ (a region defined by the line $Tr=Tr_{20}$, the boundary $z_{22}$, the Tr axis and the Nm axis) represents a controllable range where the "output maximizing control" is possible in the case where the minimum induced voltage constant Ke is set.

Compared with the case where the induced voltage constant Ke is constant shown in FIG. 7(a), in FIG. 7(b), the controllable range of the motor 1 can be expanded in the direction of increasing the output torque Tr as shown by the arrow Ar2 in the drawing by increasing the induced voltage constant Ke. In addition, the controllable range of the motor 1 can be expanded in the direction of increasing the number of revolutions Nm as shown by the arrow Ar1 in the drawing by decreasing the induced voltage constant Ke.

FIG. 8(a) shows changes in phase between the d-axis current and the q-axis current (referred to as current phase hereinafter) when achieving the constant torque at a point $P_{20}$ (a point that always lies within the controllable range of the "torque/current maximizing control" in all cases where the maximum, the moderate and the minimum induced voltage constant Ke are set) in FIG. 7(b). The left-hand axis of ordinates indicates the magnitude of the dq-axis current and the loss of the motor 1, the right-hand axis of ordinates indicates the efficiency of the motor 1, and the axis of abscissas indicates the current phase.

In FIG. 8(a), reference character $a_{11}$ denotes the efficiency in the case of the maximum induced voltage constant Ke, reference character $a_{12}$ denotes the efficiency in the case of the moderate induced voltage constant Ke, and reference character $a_{13}$ denotes the efficiency in the case of the minimum induced voltage constant Ke. A point $P_{31}$ is a point where the efficiency $a_{11}$ is at the maximum, a point $P_{32}$ is a point where the efficiency $a_{12}$ is at the maximum, and a point $P_{33}$ is a point where the efficiency $a_{13}$ is at the maximum.

Reference character $b_{11}$ denotes the loss in the case of the maximum induced voltage constant, reference character $b_{12}$ denotes the loss in the case of the moderate induced voltage constant Ke, and reference character $b_{13}$ denotes the loss in the case of the minimum induced voltage constant Ke. A point $P_{34}$ is a point where the loss $b_{11}$ is at the minimum, a point $P_{35}$ is a point where the loss $b_{12}$ is at the minimum, and a point $P_{36}$ is a point where the loss $b_{13}$ is at the minimum.

Reference character $c_{11}$ denotes the magnitude of the dq-axis current in the case of the maximum induced voltage constant Ke, reference character $c_{12}$ denotes the magnitude of the dq-axis current in the case of the moderate induced voltage constant Ke, and reference character $c_{13}$ denotes the magnitude of the dq-axis current in the case of the minimum induced voltage constant Ke. A point $P_{37}$ is a point where the magnitude of the dq-axis current $c_{11}$ is at the minimum, a point $P_{38}$ is a point where the magnitude of the dq-axis current $c_{12}$ is at the minimum, and a point $P_{39}$ is a point where the magnitude of the dq-axis current $c_{13}$ is at the minimum.

As can be seen from the efficiencies $a_{11}$ to $a_{13}$ and the magnitudes of the dq-axis current $c_{11}$ to $c_{13}$ in FIG. 8(a), the current phase differs between the setting of the dq-axis current ($P_{31}$, $P_{32}$, $P_{33}$) according to the "efficiency maximizing control" and the setting of the dq-axis current ($P_{37}$, $P_{38}$, $P_{39}$) according to the "torque/current maximizing control", and the magnitude of the dq-axis current is smaller in the "torque/current maximizing control" than in the "efficiency maximizing control". In addition, from ($P_{37}$, $P_{38}$, $P_{38}$) it can be seen that the magnitude of the dq-axis current required to achieve the constant torque can be reduced by changing the induced voltage constant Ke.

FIG. 8(b) shows changes in current phase when achieving the constant output torque at a point $P_{21}$ (a point that always lies outside of the controllable range of the "torque/current maximizing control" in all cases where the maximum, the moderate and the minimum induced voltage constant are set)

in FIG. 7(b). As in FIG. 8(a), the left-hand axis of ordinates indicates the magnitude of the dq-axis current and the loss of the motor 1, the right-hand axis of ordinates indicates the efficiency of the motor 1, and the axis of abscissas indicates the current phase.

In FIG. 8(b), reference character $a_{21}$ denotes the efficiency in the case of the maximum induced voltage constant Ke, reference character $a_{22}$ denotes the efficiency in the case of the moderate induced voltage constant Ke, and reference character $a_{23}$ denotes the efficiency in the case of the minimum induced voltage constant Ke. A point $P_{41}$ is a point where the efficiency $a_{21}$ is at the maximum, a point $P_{42}$ is a point where the efficiency $a_{22}$ is at the maximum, and a point $P_{43}$ is a point where the efficiency $a_{23}$ is at the maximum.

Reference character $b_{21}$ denotes the loss in the case of the maximum induced voltage constant Ke, reference character $b_{22}$ denotes the loss in the case of the moderate induced voltage constant Ke, and reference character $b_{23}$ denotes the loss in the case of the minimum induced voltage constant Ke. Reference character $c_{21}$ denotes the magnitude of the dq-axis current in the case of the maximum induced voltage constant Ke, reference character $c_{22}$ denotes the magnitude of the dq-axis current in the case of the moderate induced voltage constant Ke, and reference character $c_{23}$ denotes the magnitude of the dq-axis current in the case of the minimum induced voltage constant Ke. A point $P_{47}$ is a point where the magnitude of the dq-axis current $c_{21}$ is at the minimum, a point $P_{48}$ is a point where the magnitude of the dq-axis current $c_{22}$ is at the minimum, and a point $P_{49}$ is a point where the magnitude of the dq-axis current $c_{23}$ is at the minimum.

Also in FIG. 8(b), as can be seen from the efficiencies $a_{11}$ to $a_{13}$ and the magnitudes of the dq-axis current $c_{11}$ to $c_{13}$, the current phase differs between the setting of the dq-axis current ($P_{41}$, $P_{42}$, $P_{43}$) according to the "efficiency maximizing control" and the setting of the dq-axis current ($P_{47}$, $P_{48}$, $P_{49}$) according to the "torque/current maximizing control". Furthermore, it can be seen that, although not as significant as shown in FIG. 8(a), the magnitude of the dq-axis current is smaller in the "torque/current maximizing control" than in the "efficiency maximizing control". Furthermore, from the setting ($P_{47}$, $P_{48}$, $P_{49}$), it can be seen that the magnitude of the dq-axis current required to achieve the constant torque can be reduced by changing the induced voltage constant Ke.

Now, with reference to FIGS. 9 to 11, a procedure of creating the correlation map used in STEP 2 in FIG. 5 will be described. FIG. 9 shows a procedure of creating an optimal Ke map for determining an optimal induced voltage constant Ke for each output voltage Vdc of the direct-current power supply in the case where the output voltage Vdc is switched in three steps (Vdc=V1, V2, V3).

In FIG. 9, steps S1 and S2 are processings of creating an optimal Ke map for the output voltage Vdc=V1. In step S1, for each induced voltage constant Ke (Ke=Ke1, Ke2, Ke3 and Ke4, where Ke4<Ke3<Ke2<Ke1), a dq current map is created in which the dq-axis current is plotted while changing the torque Tr and the number of revolutions Nm of the motor 1.

Specifically, as shown in FIG. 10(a), a dq current map $M_{11}$ is created by plotting the dq-axis current while changing the number of revolutions Nm and the output torque Tr under the conditions that Vdc=V1 and Ke=Ke1. The plotting is conducted by experiment or computer simulation.

Similarly, a dq current map $M_{12}$ is created under the conditions that Vdc=V1 and Ke=Ke2, a dq current map $M_{13}$ is created under the conditions that Vdc=V1 and Ke=Ke3, and a dq current map $M_{14}$ is created under the conditions that Vdc=V1 and Ke=Ke4. Then, the four dq current maps $M_{11}$, $M_{12}$, $M_{13}$ and $M_{14}$ created in this way are compared in S2, and an optimal Ke map KM1 is created by selecting the induced voltage constant Ke for which the magnitude of the dq-axis current is at the minimum for each plotted point (torque Tr, number of revolutions Nm).

As shown in FIG. 10(b), the optimal Ke map KM1 determines the induced voltage constant Ke for which the dq-axis current is at the minimum with respect to the torque Tr and the number of revolutions Nm. For example, for a point (Tr, Nm)=($Tr_{10}$, $Nm_{10}$) in the drawing, the induced voltage constant Ke=Ke1 is determined.

Steps S3 and S4 are processings of creating an optimal Ke map for the output voltage Vdc=V2. As in steps S1 and S2 described above, in step S3, a dq current map $M_{21}$ is created under the conditions that Vdc=V2 and Ke=Ke1, a dq current map $M_{22}$ is created under the conditions that Vdc=V2 and Ke=Ke2, a dq current map $M_{23}$ is created under the conditions that Vdc=V2 and Ke=Ke3, and a dq current map $M_{24}$ is created under the conditions that Vdc=V2 and Ke=Ke4, and in step S4, an optimal Ke map KM2 under the condition that Vdc=V2 is created.

Steps S5 and S6 are processings of creating an optimal Ke map for the output voltage Vdc=V3. As in steps S1 and S2 and steps S3 and S4 described above, in step S5, a dq current map $M_{31}$ is created under the conditions that Vdc=V3 and Ke=Ke1, a dq current map $M_{32}$ is created under the conditions that Vdc=V3 and Ke=Ke2, a dq current map $M_{33}$ is created under the conditions that Vdc=V3 and Ke=Ke3, and a dq current map $M_{34}$ is created under the conditions that Vdc=V3 and Ke=Ke4, and in step S6, an optimal Ke map KM3 under the condition that Vdc=V3 is created.

Through the steps S1 to S6 in FIG. 9 described above, as shown in FIG. 11(a), there is created a correlation map composed of the optimal Ke map KM1 for the output voltage Vdc=V1, the optimal Ke map KM2 for the output voltage Vdc=V2, and the optimal Ke map KM3 for the output voltage Vdc=V3. FIG. 11(b) shows an exemplary setting of the induced voltage constant Ke according to the optimal Ke maps KM1, KM2 and KM3. In this drawing, the axis of ordinates indicates the torque Tr (power running torque and regeneration torque), and the axis of abscissas indicates the number of revolutions Nm.

In FIG. 11(b), reference character D1 denotes a region in which the induced voltage constant Ke1 is selected, reference character D2 denotes a region in which the induced voltage constant Ke2 is selected, reference character D3 denotes a region in which the induced voltage constant Ke3 is selected, and reference character D4 denotes a region in which the induced voltage constant Ke4 is selected. In this way, by successively decreasing the induced voltage constant (Ke1→Ke2→Ke3→Ke4) as the number of revolutions of the motor 1 increases, the controllable range of the motor 1 can be expanded.

As an alternative to the correlation map, the optimal Ke, for which the magnitude of the dq-axis current is at the minimum, can be determined by calculating the dq-axis current required under the given condition of the power supply voltage Vdc, the torque command Tr_c and the number of revolutions Nm for each induced voltage constant Ke (Ke=Ke1, Ke2, Ke3, Ke4). FIG. 12 is a flowchart illustrating a process of determining the optimal Ke by calculating the dq-axis current in this way.

In the flowchart of FIG. 12, first in STEP 10, the output voltage Vdc of the direct-current power supply, the torque command Tr_c and the number of revolutions Nm are obtained. Then, a loop from STEP 11 to STEP 15 is carried out for Ke(n)=Ke(1), Ke(2), Ke(3), Ke(4). In STEP 12, the current command values (Id_c(n), Iq_c(n)) are calculated for the values Vdc, Tr_c, Nm and K(n) in the same manner as in the case of the current command calculator 50 described later. In the following STEP 13, the output torque Tr(n) for the current command values Ke(n), Id_c(n) and Iq_c(n) is calculated, and in STEP 14, the values Tr(n), Id_c(n) and Iq_c(n) are stored in a memory (not shown).

Then, in STEP 16, the optimal Ke, for which the output torque Tr(n) is at the maximum, and the magnitude of the dq-axis current (a vector sum of the current command values Id_c(n) and Iq_c(n)) is at the maximum, is determined. Thus, as in the case of the search using the optimal Ke maps described above, the induced voltage constant Ke for which the magnitude of the dq-axis current is at the minimum for the torque command Tr_c can be determined.

Then, in STEP 3 in FIG. 5, the Ke command calculator 90 outputs the optimal Ke determined in STEP 2 to the phase difference controller 80 (see FIG. 1) as the command value Ke_c of the induced voltage constant. The following STEP 4 is a processing carried out by the phase difference controller 80, and the phase difference controller 80 applies the value Ke_c to a Ke/θd conversion map shown in FIG. 13, thereby determining the corresponding value θd as the command value θd_c of the rotor phase difference. The Ke/θd map is created by experiment or computer simulation, and data of the Ke/θd map is previously stored in a memory.

Then, the phase difference controller 80 outputs the command value θd_c of the rotor phase difference to the actuator 25. In response to this, the actuator 25 adjusts the rotor phase difference of the motor 1 to θd_c, and, in this way, the induced voltage constant Ke of the motor 1 is adjusted to the optimal Ke.

The following STEP 5 is a processing carried out by the current command calculator 50 (see FIG. 1). Basically, the current command calculator 50 calculates the command value Id_c of the d-axis current and the command value Iq_c of the q-axis current by the "torque/current maximizing control" and outputs the results to the subtracters 51 and 52 (see FIG. 1).

First, with reference to FIGS. 14 to 21, a basic idea of the calculation process of the command value Id_c of the d-axis current and the command value Iq_c of the q-axis current by the current command calculator 50 will be described. Supposing that reference character $\Psi a$ denotes the flux linkage for the optimal Ke calculated by the Ke command calculator 90, the torque of the motor 1 can be expressed by the following formula (1).

[Formula 1]

$$Tr = P_n[\psi_a \cdot Id + (Ld - Lq)Id \cdot Iq] \\ = P_n\left[\psi_a \cdot I\cos\beta + \frac{1}{2}(Lq - Ld)I^2\sin 2\beta\right] \quad (1)$$

In this formula, "$P_n$" represents the number of pairs of poles, "$\Psi_a$" represents the flux linkage for the optimal Ke, "Id" represents the value of the d-axis current, "Iq" represents the value of the q-axis current, "Ld" represents the inductance of the d-axis armature, "Lq" represents the inductance of the q-axis armature, "β" represents the current phase, "I" represents the magnitude of the dq-axis current ($I=\sqrt{(Id^2+Iq^2)}$, $Id=I\sin\beta$, $Iq=I\cos\beta$).

Partial differentiation with respect to the current phase β is performed on the formula (1), and the resulting formula is solved by supposing that the formula equals to 0 about β. Then, the current phase β for which the torque Tr is at the maximum with respect to the dq-axis current Idq can be determined by the following formula (2).

[Formula 2]

$$\beta = \sin^{-1}\left(\frac{-\psi_a + \sqrt{\psi_a^2 + 8(Lq - Ld)^2 I^2}}{4(Lq - Ld)I}\right) \quad (2)$$

The formula (2) gives a relationship between the d-axis current Id and the q-axis current Iq that provide the maximum torque for the optimal Ke, and the relationship is expressed by the following formula (3).

[Formula 3]

$$Id = \frac{\psi_a}{2(Lq - Ld)} - \sqrt{\frac{\psi_a^2}{4(Lq - Ld)} + Iq^2} \quad (3)$$

Figure 14:
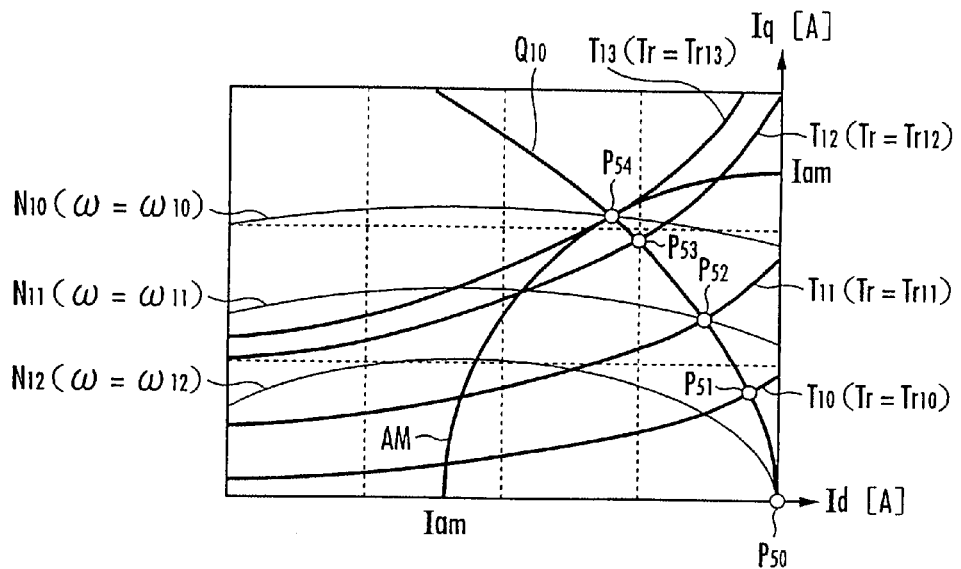
FIGS. 14($a$) and 14($b$) include diagrams for illustrating a method of determining an optimal current command value.
Figure 14:
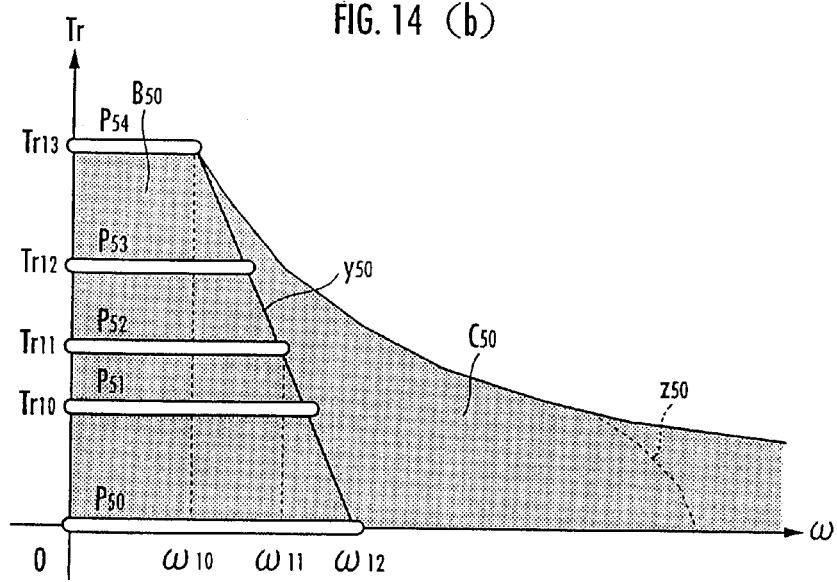
Figure 15:
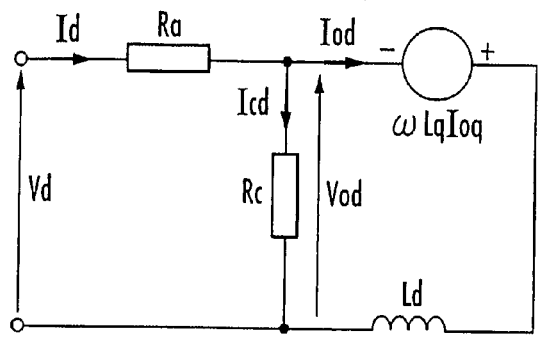
FIGS. 15(a), 15(b), and 15(c) include diagrams for illustrating the method of determining an optimal current command value.
Figure 15:
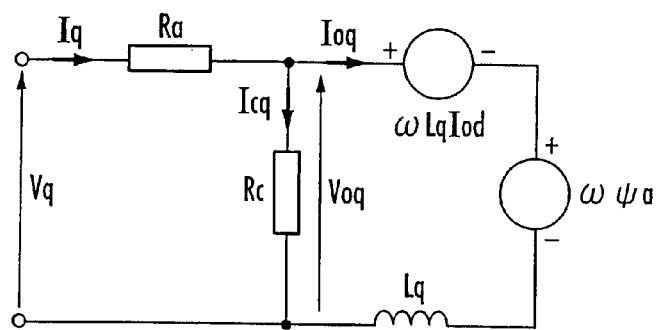
Figure 15:
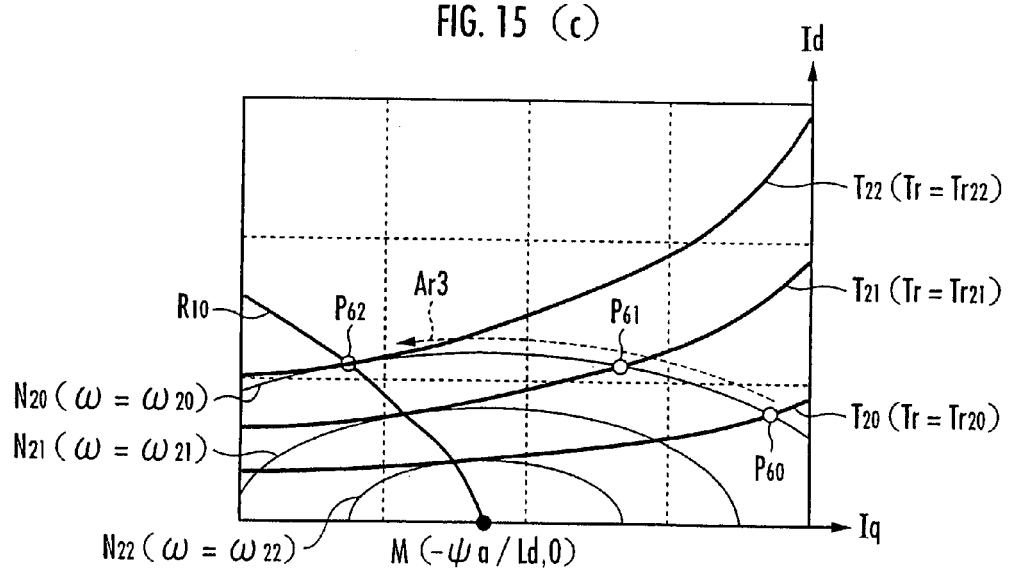
Figure 16:
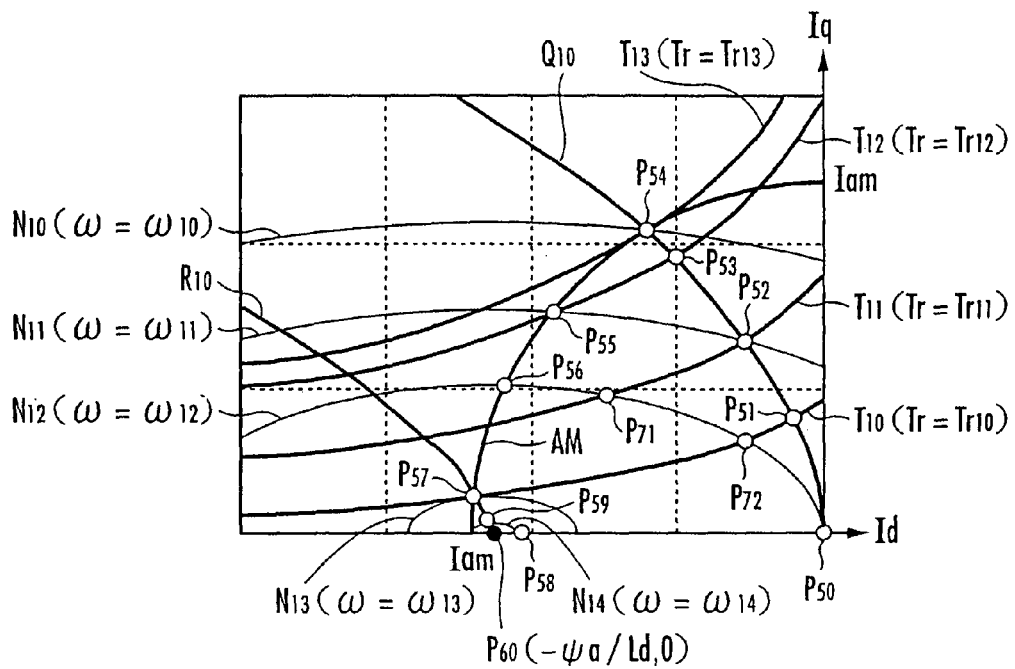
FIGS. 16(a) and 16(b) include diagrams for illustrating the method of determining an optimal current command value.
Figure 16:
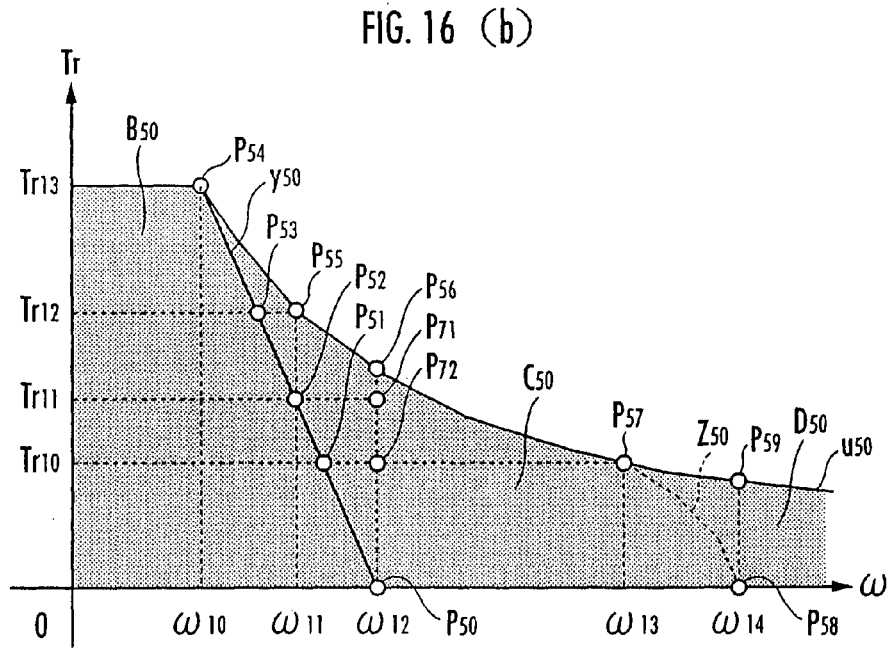
Figure 17:
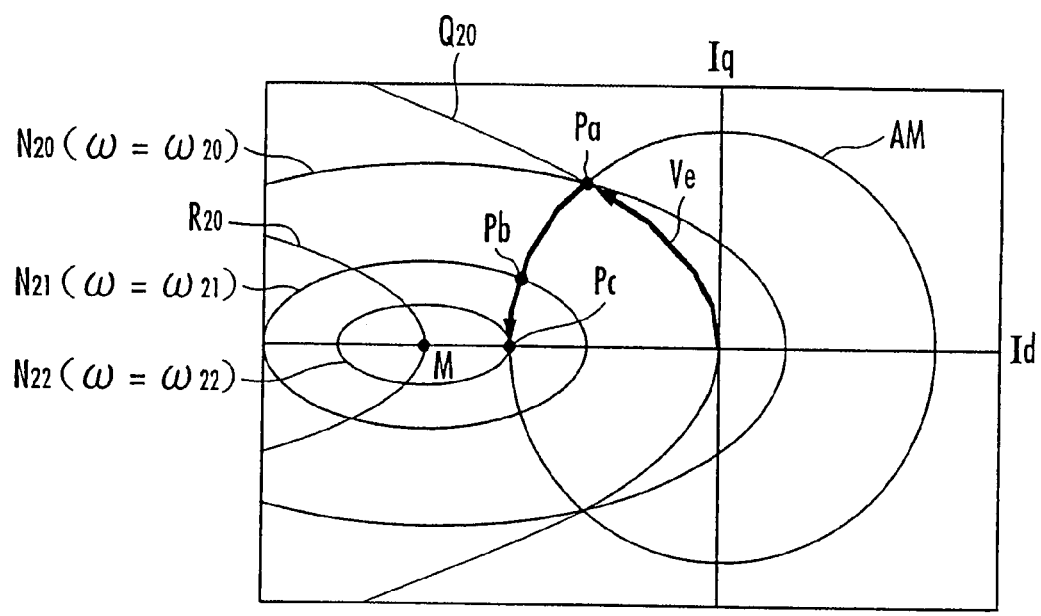
FIGS. 17(a) and 17(b) include diagrams for illustrating the method of determining an optimal current command value.
Figure 17:
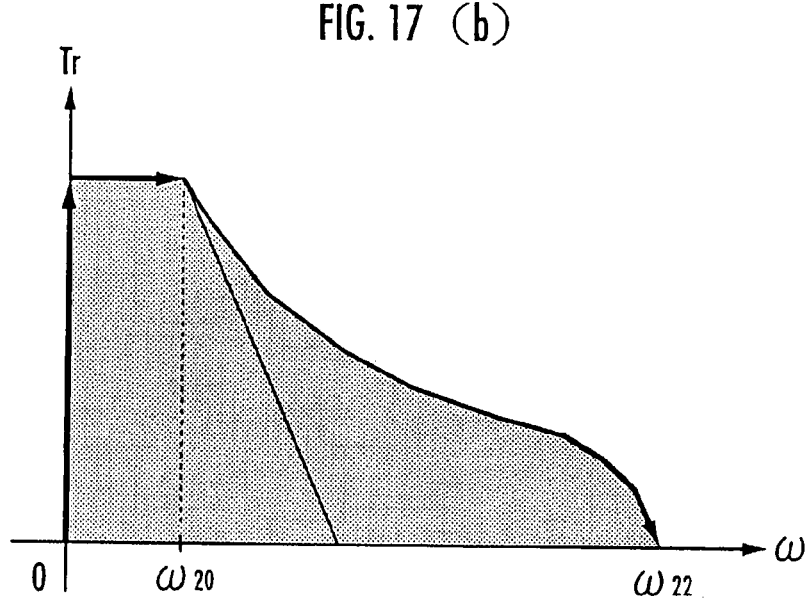
Figure 18:
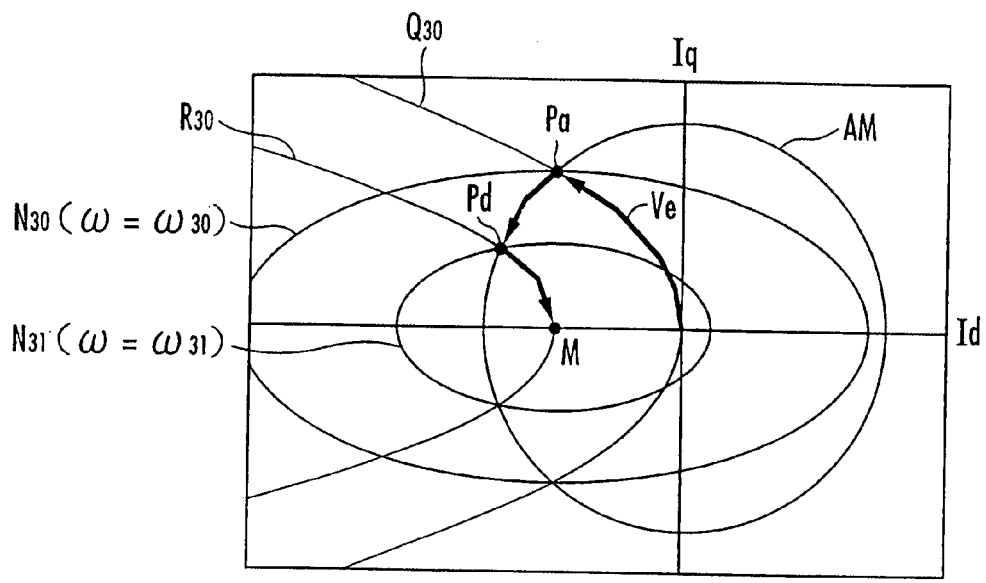
FIGS. 18(a) and 18(b) include diagrams for illustrating the method of determining an optimal current command value.
Figure 18:
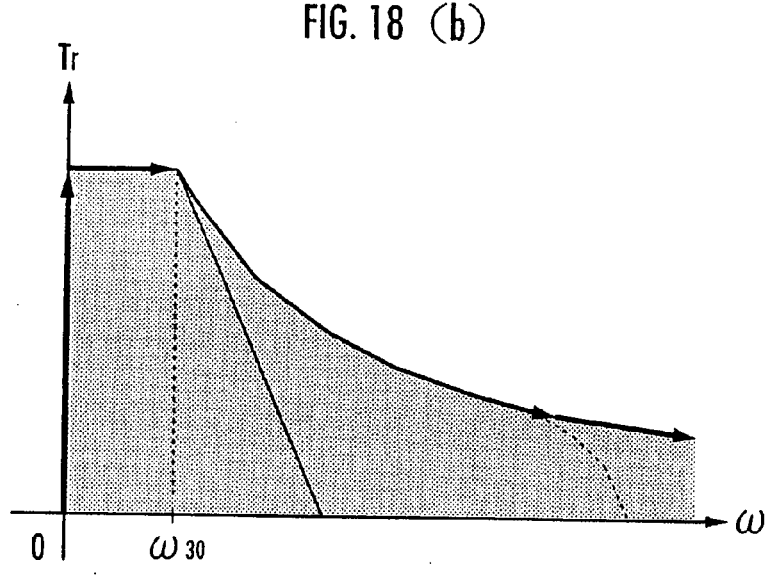

FIG. 14(*a*) shows a dq-coordinate system, in which the axis of ordinates indicates the q-axis current, and the axis of abscissas indicates the d-axis current. FIG. 14(*a*) shows constant torque curves $T_{10}$, $T_{11}$, $T_{12}$ and $T_{13}$ that represent combinations of values Id and Iq that provide torque values Tr of $Tr_{10}$, $Tr_{11}$, $Tr_{12}$ and $Tr_{13}$, a maximum torque/current curve $Q_{10}$ that represents a combination of values Id and Iq according to the "torque/current maximizing control" that satisfies the relationship of the formula (3), a current limitation circle AM (a circle for which $Id^2+Iq^2=Iam^2$, where "Iam" represents a limited current), and constant induced voltage ellipses $N_{10}$, $N_{11}$ and $N_{12}$ that represent combinations of values Id and Iq for which the dq induced voltage V0, which is a vector sum of the induced voltage produced in the d-axis armature and the induced voltage produced in the q-axis armature, equals to a limited voltage $V_{0m}$ in cases where the angular velocity ω calculated from a formula (8) described later equals to $\omega_{10}$, $\omega_{11}$ and $\omega_{12}$ ($\omega_{10}<\omega_{11}<\omega_{12}$).

If the combination of the d-axis current and the q-axis current that satisfies the formula (3) can be calculated in a region that lies within a constant induced voltage ellipse corresponding to the angular velocity ω of the motor 1 and the current limitation circle AM, that is, if there are no limitations by the limited voltage $V_{0m}$ and the limited current Iam, the d-axis current can be set at the command value Id_c thereof, and the q-axis current can be set at the command value Iq_c thereof. In FIG. 14(*a*), as the torque sequentially increases from $Tr_{10}$ to $Tr_{13}$ ($Tr_{10}\rightarrow Tr_{11}\rightarrow Tr_{12}\rightarrow Tr_{13}$), a combination of the d-axis current and the q-axis current that make the magnitude of the dq-axis current required to produce each torque minimum can be calculated at points $P_{51}$, $P_{52}$, $P_{53}$ and $P_{54}$ in this order on the maximum torque/current curve $Q_{10}$ represented by the formula (3), and the "torque/current maximizing control" can be carried out.

FIG. 14(*b*) shows the relationship shown in FIG. 14(*a*), in which the axis of ordinates indicates the torque (Tr), and the axis of abscissas indicates the angular velocity (ω). In this drawing, a region $B_{50}$ (a region defined by the line $Tr=Tr_{13}$, the boundary $y_{50}$, the Tr axis and the ω axis) represents a controllable range where the "torque/current maximizing control" is possible. A region $C_{50}$ (a region defined by the line $Tr=Tr_{13}$, the boundary $z_{50}$, the Tr axis and the ω axis) represents a controllable range where the "output maximizing control" based on the field weakening control is possible.

Referring to FIG. 14(b), within a range where the torque Tr is equal to or less than $Tr_{13}$, and the angular velocity ω is equal to or less than $ω_{12}$, combinations of the d-axis current Id and the q-axis current Iq that satisfies the formula (3) can be calculated sequentially at the points $P_{51}$, $P_{52}$, $P_{53}$ and $P_{54}$ in this order as the torque Tr increases.

FIG. 15(a) shows an equivalent circuit of the d-axis armature of the motor 1, and FIG. 15(b) shows an equivalent circuit of the q-axis armature. In this case, voltage equations can be expressed by the following formulas (4) and (5).

[Formula 4]

$$\begin{bmatrix} Vd \\ Vq \end{bmatrix} = \begin{bmatrix} Ra & 0 \\ 0 & Ra \end{bmatrix}\begin{bmatrix} Id \\ Iq \end{bmatrix} + \begin{bmatrix} Vod \\ Voq \end{bmatrix} + p\begin{bmatrix} Ld & 0 \\ 0 & Lq \end{bmatrix}\begin{bmatrix} Id \\ Iq \end{bmatrix} \qquad (4)$$

[Formula 5]

$$\begin{bmatrix} Vod \\ Voq \end{bmatrix} = \begin{bmatrix} 0 & -\omega Lq \\ \omega Ld & 0 \end{bmatrix}\begin{bmatrix} Id \\ Iq \end{bmatrix} + \begin{bmatrix} 0 \\ \omega \psi_a \end{bmatrix} \qquad (5)$$

In these formulas, "Ra" and "Rc" represents the resistance of the d-axis armature and the q-axis armature, "Ld" represents the inductance of the d-axis armature, "Lq" represents the inductance of the q-axis armature, and "ωΨa" represents the back electromotive force produced in the q-axis armature.

From the formulas (4) and (5), the following formulas (6) and (7) can be derived.

[Formula 6]

$$V_o = \sqrt{Vod^2 + Voq^2} = \omega\sqrt{(LdId + \psi_a)^2 + (LqIq)^2} \qquad (6)$$

In this formula, "$V_o$" represents the dq induced voltage (the magnitude of the vector sum of the induced voltage produced in the d-axis armature and the induced voltage produced in the q-axis armature), "$V_{od}$" represents the induced voltage produced in the d-axis armature, "$V_{oq}$" represents the induced voltage produced in the q-axis armature, and "ω" represents the angular velocity of the motor.

[Formula 7]

$$V_a = \sqrt{Vd^2 + Vq^2} = \sqrt{(RaId - \omega LqIq)^2 + (RaIq + \omega LdId + \omega\psi_a)^2} \qquad (7)$$

In this formula, "$V_a$" represents the magnitude of the vector sum of the d-axis voltage and the q-axis voltage.

In this case, the controllable range of the motor can be expanded by reducing the dq voltage $V_0$ to the limited voltage $V_{0m}$ or lower by the field weakening control. The following formula (8) is derived by substituting the value $V_0 = V_{0m}$ into the formula (6).

[Formula 8]

$$(LdId + \psi_a)^2 + (LqIq)^2 = \left(\frac{Vom}{\omega}\right)^2 \qquad (8)$$

The formula (8) is represented by an ellipse (referred to as constant induced voltage ellipse hereinafter) on the dq coordinate system. The diameter of the constant induced voltage ellipse decreases as the velocity of the motor 1 increases. FIG. 15(c) shows a dq coordinate system showing constant torque curves $T_{20}$ ($Tr = Tr_{20}$), $T_{21}$ ($Tr = Tr_{21}$) and $T_{22}$ ($Tr = Tr_{22}$) that represent combinations of values Id and Iq for which the torque Tr is constant, constant induced voltage ellipses $N_{20}$ ($ω = ω_{20}$), $N_{21}$ ($ω = ω_{21}$) and $N_{22}$ ($ω = ω_{22}$), and a maximum torque/magnetic flux curve $R_{10}$.

For example, in a case where the angular velocity ω of the motor 1 equals to a constant value $ω_{20}$ ($ω = ω_{20}$), the vector (Id, Iq) representing the dq-axis current moves from a point $P_{60}$ to a point $P_{61}$ and then from the point $P_{61}$ to a point $P_{62}$ on the constant induced voltage ellipse $N_{20}$ ($ω = ω_{20}$) as the load increases. According to the formula (8), if the angular velocity ω and the q-axis current Iq are given, the d-axis current Id can be calculated from the following formulas (9) and (10).

[Formula 9]

$$Id = \frac{-\psi_a + \sqrt{\left(\frac{Vom}{\omega}\right)^2 - (LqIq)^2}}{Ld} \qquad (9)$$

[Formula 10]

$$Id = \frac{-\psi_a - \sqrt{\left(\frac{Vom}{\omega}\right)^2 - (LqIq)^2}}{Ld} \qquad (10)$$

Because of the two formulas (9) and (10), two values Id can be calculated for one value Iq. Of the two values, the value for which the magnitude of the dq-axis current is smaller is preferable. Thus, at the points $P_{60}$, $P_{61}$ and the like in FIG. 15(c), the d-axis current Id is calculated by the formula (9). And, after the d-axis current Id becomes equal to $-\Psi_a/Ld$ ($Id = -\Psi_a/Ld$) as the load increases, the d-axis current Id is calculated by the formula (10). When the vector (Id, Iq) representing the dq-axis current reaches the intersection $P_{62}$ with the maximum torque/magnetic flux curve $R_{10}$, the torque reaches the maximum.

FIG. 16(a) is the same as FIG. 14(a) further including the maximum torque/magnetic flux curve $R_{10}$. In this case, the torque/current maximizing control (a range from $P_{50}$ to $P_{54}$) and the field weakening control (a range from $P_{54}$ to $P_{57}$) are possible within the region inside the current limitation circle AM.

Methods of calculating the current command values (Id_c, Iq_c) to be set under the various conditions described above can be summarized as follows.

[Torque/Current Maximizing Control Region]

In a low-velocity operating region where the dq induced voltage $V_0$ is low, there is a sufficient voltage allowance with respect to the limited voltage $V_{0m}$, and therefore, only the limited current Iam needs to be considered. To achieve the dq-axis current that maximizes the value of torque/current, the current command value (Id_c, Iq_c) can be calculated under the condition of the formula (3).

The relationship between the d-axis current Id and the q-axis current Iq in the "torque/current maximizing control" is represented by the maximum torque/current curve $Q_{10}$ shown in FIG. 16(a). The produced torque is maximized when the magnitude of the dq-axis current is I=Iam, and the operating point at this moment is the intersection $P_{54}$ of the maximum torque/current curve $Q_{10}$ and the current limitation circle AM. The d-axis current Ida and the q-axis current Iqa at the point $P_{54}$ can be calculated by the following formulas (11) and (12).

[Formula 11]

$$Ida = \frac{\psi_a}{4(Lq - Ld)} - \sqrt{\frac{\psi_a^2}{16(Lq - Ld)^2} + \frac{Iam^2}{2}} \qquad (11)$$

-continued

[Formula 12]

$$Iqa = \sqrt{Iam^2 - Ida^2} \quad (12)$$

The armature flux linkage $\Psi_{0a}$ at this moment can be calculated by the following formula (13), and the electrical angular velocity $\omega_{base}$ at which the dq induced voltage V0 (=$\omega\Psi_{0a}$) reaches the limited voltage $V_{0m}$ can be calculated by the following formula (14).

[Formula 13]

$$\psi_{oa} = \sqrt{(\psi_a + Ld \cdot Ida)^2 + (Lq \cdot Iqa)^2} \quad (13)$$

[Formula 14]

$$\omega_{base} = \frac{Vom}{\psi_{oa}} \quad (14)$$

Referring to FIG. 16(a), the constant voltage limitation ellipse $N_{10}$ also intersects with the maximum torque/current curve $Q_{10}$ and the current limitation circle AM at the intersection $P_{54}$, so that $\omega_{10} = \omega_{base}$, and the current vector (Id, Iq) cannot be adjusted to the point $P_{54}$ at an angular velocity equal to or higher than $\omega_{10}$. In this case, a "constant torque operating region" is up to the upper limit $\omega_{base}$ of the angular velocity (base velocity) at which the motor 1 can produce the maximum torque. In the "constant torque operating region", the magnitude of the dq-axis current I=Iam, and the dq induced voltage $V_0 < V_{0m}$.

FIG. 16(b) is a diagram showing the content of FIG. 16(a), in which the axis of ordinates indicates the torque (Tr), and the axis of abscissas indicates the angular velocity ($\omega$). The "constant torque operating region" spans the range of $\omega$=0 to $\omega_{10}$.

[First Equivalent Field Weakened Region]

In a velocity region where the angular velocity is higher than $\omega_{base}$, not only the limited current Iam but also the limited voltage $V_{0m}$ has to be considered. Taking into account only the limited voltage $V_{0m}$, the torque is maximized by a "torque/magnetic flux maximizing control". In the "torque/magnetic flux maximizing control", since the limitation of the limited current Iam is not taken into account, the application range is limited if the limitation of the limited current Iam is taken into account. That is, in the range where the maximum torque/magnetic flux curve $R_{10}$ does not lie inside the current limitation circle AM in FIG. 16(a), the "torque/magnetic flux maximizing control" cannot be applied.

In the velocity region where the operation at the point $P_{54}$ (the "torque/current maximizing control" for Idq=Iam) and the "torque/magnetic flux maximizing control" are impossible, the produced torque is maximized when the current vector is adjusted to the intersection $P_{55}$ (in the case where $\omega=\omega_{11}$) or $P_{56}$ (in the case where $\omega=\omega_{12}$) of the current limitation circle AM and the constant voltage limitation ellipse. In this case, the d-axis current Idb and the q-axis current Iqb can be calculated by the following formulas (15) and (16).

[Formula 15]

$$Idb = \frac{\psi_a Ld - \sqrt{(\psi_a Lq)^2 + (Lq^2 - Ld^2)\left\{(LaIam)^2 - \left(\frac{Vom}{\omega}\right)^2\right\}}}{Lq^2 - Ld^2} \quad (15)$$

[Formula 16]

$$Iqb = \sqrt{Iam^2 - Idb^2} \quad (16)$$

This control mode corresponds to a case where the dq-axis current Idq is equal to the limited current Iam in the equivalent field weakening control, and the magnitude I of the dq-axis current is always equal to Iam (I=Iam), and the dq induced voltage $V_0$ is always equal to $V_{0m}$ ($V_0=V_{0m}$).

FIG. 17(a) shows a maximum torque/current curve $Q_{20}$, a maximum torque/magnetic flux curve $R_{20}$, a current limitation circle AM and constant induced voltage ellipses $N_{20}$ ($\omega=\omega_{20}$), $N_{21}$ ($\omega=\omega_{21}$) and $N_{22}$ ($\omega=\omega_{22}$) plotted on a dq coordinate system. FIG. 17(b) shows the content of FIG. 17(a), in which the axis of ordinates indicates the torque (Tr), and the axis of abscissas indicates the angular velocity ($\omega$).

In the case where $\Psi dmin=\Psi a-LdIam \geq 0$, as shown in FIG. 17(a), the maximum torque/magnetic flux curve $R_{20}$ lies outside of the current limitation circle AM, and therefore, the "torque/magnetic flux maximizing control" cannot be applied. Therefore, at the angular velocity $\omega_{22}$ at which the constant voltage limitation ellipse $N_{22}$ is in contact with the current limitation circle AM, the current vector (Id, Iq) reaches a point Pc (Id=−Iam, Iq=0), and the output torque of the motor 1 reaches 0 (output limit). The angular velocity $\omega_c$ ($\omega_{22}$ in FIG. 17(a)) at which the output limit is reached can be calculated by the following formulas (17) and (18).

[Formula 17]

$$\omega_c = \frac{Vom}{\psi_a - LdIam} = \frac{Vom}{\psi_{dmin}} \quad (17)$$

[Formula 18]

$$\psi_{d\,min} = \psi_a - LdIam \quad (18)$$

[Second Equivalent Field Weakening Control]

Similarly to FIG. 17(a), FIG. 18(a) shows a maximum torque/current curve $Q_{30}$, a maximum torque/magnetic flux curve $R_{30}$, a current limitation circle AM and constant induced voltage ellipses $N_{30}$ ($\omega=\omega_{30}$) and $N_{31}$ ($\omega=\omega_{31}$) plotted on a dq coordinate system. FIG. 18(b) shows the content of FIG. 18(a), in which the axis of ordinates indicates the torque (Tr), and the axis of abscissas indicates the angular velocity ($\omega$).

In the case where $\Psi_{dmin}=\Psi a-LdIam<0$, as shown in FIG. 18(a), the maximum torque/magnetic flux curve $R_{30}$ lies within the current limitation circle AM, and therefore, the "torque/magnetic flux maximizing control" is possible in a high velocity region. In order to achieve the maximum torque output taking into account only the limitation of the limited voltage $V_{0m}$ when there is no limitation of the limited current Iam, the "torque/magnetic flux maximizing control" can be applied. In this case, the current vector (Id, Iq) can be calculated as the intersection of the maximum torque/magnetic flux curve $R_{30}$ and the constant induced voltage ellipse $N_{31}$ from the functions with respect to the angular velocity $\omega$ expressed by the following formulas (19) to (21).

[Formula 19]

$$Idc = -\frac{\psi_a + \Delta\psi_d}{Ld} \quad (19)$$

-continued

[Formula 20]

$$Iqc = \frac{\sqrt{\left(\frac{Vom}{\omega}\right)^2 - (\Delta\psi_d)^2}}{Lq} \quad (20)$$

[Formula 21]

$$\Delta\psi_d = \frac{-Lq\psi_a + \sqrt{(Lq\psi_a)^2 + 8(Lq-Ld)^2\left(\frac{Vom}{\omega}\right)^2}}{4(Lq-Ld)} \quad (21)$$

In this case, the calculated current vector (Id, Iq)=(Idc, Iqc) moves toward a point M on the maximum torque/magnetic flux curve $R_{30}$ in FIG. 18(a) as the velocity increases. In the case where $\Psi_{dmin}=\Psi a-LdIam<0$, as shown in FIG. 18(a), the point M lies within the current limitation circle AM, and therefore, the maximum output can be achieved by adjusting the current vector to the intersection of the maximum torque/magnetic pole curve and the voltage limitation ellipse $N_{31}$ in a high velocity region equal to or higher than the velocity $\omega_d$ (=$\omega_{31}$) at which the constant voltage limitation ellipse $N_{31}$ intersects with the intersection Pd of the maximum torque/magnetic flux curve R and the current limitation circle AM. In this control mode, the values Idq and Vdq satisfy the following relationships: Idq<Iam, and $V_0=V_{0m}$.

FIG. 18(b) shows the content of FIG. 18(a), in which the axis of ordinates indicates the torque (Tr), and the axis of abscissas indicates the angular velocity ($\omega$). In FIG. 18(b), the range in which the current vector (Id, Iq) can be calculated is expanded compared with FIG. 17(b).

Based on the above description, with reference to the flowcharts of FIGS. 19 to 21, there will be described a process of setting current command values (a command value Id_c of the d-axis current and a command value Iq_c of the q-axis current), which is carried out by the current command calculator 50 in STEP 5 in FIG. 5.

In STEP 20 in FIG. 19, the current command calculator 50 calculates the limited voltage $V_{0m}$ from the output voltage Vdc of the direct-current power supply, calculates the angular velocity $\omega$ of the motor 1 from the number of revolutions Nm of the motor 1 calculated by the differentiator 71 (see FIG. 1), and calculates the flux linkage $\Psi a$ for the optimal Ke calculated by the Ke command calculator 90.

Then, in the following STEP 21, the torque command Tr_c and the flux linkage $\Psi a$ calculated in STEP 20 are substituted into the formulas (1) to (3), thereby calculating a first dq current setting (Id1, Iq1). In STEP 22, the dq induced voltage $V_0$ (which corresponds to a dq determination voltage according to the present invention) is calculated from the formula (6) on the assumption that (Id, Iq)=(Id1, Iq1).

In the following STEP 23, the current command calculator 50 determines whether the dq induced voltage $V_0$ is equal to or lower than the limited voltage $V_{0m}$ or not. If the dq induced voltage $V_0$ is equal to or lower than the limited voltage $V_{0m}$, the process proceeds to STEP 24. If the dq induced voltage $V_0$ is higher than the limited voltage $V_{0m}$, the process branches to STEP 40 in FIG. 20.

In the following STEP 24, it is determined whether the magnitude ($\sqrt{(Id1^2+Iq1^2)}$) of the dq-axis current according to the first dq current setting is equal to or lower than the limited current Iam or not. If the magnitude of the dq-axis current is equal to or lower than the limited current Iam, the process proceeds to STEP 25. If the magnitude of the dq-axis current is higher than the limited current Iam, the process branches to STEP 30.

In the case where the process proceeds to STEP 25, there is an operational condition that there are no limitations by the limited voltage $V_{0m}$ and the limited current Iam, the "torque/current maximizing control" can be carried out. Therefore, in STEP 25, the current command calculator 50 designates the first dq current setting (Id1, Iq1) calculated in STEP 21 as the command values (Id_c, Iq_c) of the d-axis current and the q-axis current. Then, the process proceeds to STEP 26, the current command calculator 50 ends the calculation of the current command values.

In the case where the process branches to STEP 30, there is an operational condition that there is a limitation of the limited current Iam although there is no limitation of the limited current $V_{0m}$. Thus, in STEP 30, the current command calculator 50 calculates a second dq current setting (Id2, Iq2) that maximizes the output torque with the limited current Iam in the "torque/current maximizing control" from the formulas (11) and (12). Then, in STEP 31, the current command calculator 50 designates the second dq current setting (Id2, Iq2) calculated in STEP 30 as the command values (Id_c, Iq_c) of the d-axis current and the q-axis current, and then, the process proceeds to STEP 26, and the calculation of the current command values is ended.

Then, in STEP 40 in FIG. 20, the current command calculator 50 determines whether a third dq current setting (Id3, Iq3) can be calculated from the formulas (9) and (10) or not based on whether the relation expressed by the following formula (22) holds or not.

[Formula 22]

$$|Iq| \leq \frac{Vom}{\omega Lq} \quad (22)$$

Then, if the condition of the formula (22) is met, the process proceeds to STEP 41. If the condition of the formula (22) is not met, the process branches to STEP 70 in FIG. 21.

In STEP 41, the current command calculator 50 calculates the third dq current setting (Id3, Iq3) that maximizes the output torque at the limited voltage $V_{0m}$ from the formulas (9) and (10). Then, in the following STEP 42, the current command calculator 50 determines whether or not the magnitude ($\sqrt{(Id3^2+Iq3^2)}$) of the dq-axis current according to the third dq current setting (which corresponds to a second dq determination current according to the present invention) is equal to or lower than the limited current Iam.

If the magnitude ($\sqrt{(Id3^2+Iq3^2)}$) of the dq-axis current according to the third dq current setting is equal to or lower than the limited current Iam, the process proceeds to STEP 43. In STEP 43, the current command calculator 50 designates the third dq current setting (Id3, Iq3) as the current command values (Id_c, Iq_c), the process proceeds to STEP 26 in FIG. 19, and the setting of the current command values is ended.

On the other hand, if the magnitude ($\sqrt{(Id3^2+Iq3^2)}$) of the dq-axis current according to the third dq current setting is higher than the limited current Iam in STEP 42, the process branches to STEP 50. In this case, there is an operational condition that there are limitations by the limited voltage $V_{0m}$ and the limited current Iam. In STEP 50, the current command calculator 50 determines whether a fourth dq current setting can be calculated from the formulas (15) and (16) or not based on whether the relation expressed by the following formula (23) holds or not.

[Formula 23]

$$(\psi_a Lq)^2 + (Lq^2 - Ld^2)\left\{(Lq Iam)^2 - \left(\frac{Vom}{\omega}\right)^2\right\} \geq 0 \quad (23)$$

Then, if the condition of the formula (23) is met, the process proceeds to STEP 51. If the condition of the formula (23) is not met, the process branches to STEP 60.

In STEP 51, the current command calculator 50 calculates the fourth dq current setting (Id4, Iq4) that is the intersection of the current limitation circle and the constant induced voltage ellipse from the formulas (15) and (16). Then, in the following STEP 52, the current command calculator 50 designates the fourth dq current setting (Id4, Iq4) as the current command values (Id_c, Iq_c), the process proceeds to STEP 26 in FIG. 19, and the setting of the current command values is ended.

In STEP 60, the current command calculator 50 sets the current command values (Id_c, Iq_c) as expressed by the following formulas (24) and (25), the process proceeds to STEP 26 in FIG. 19, and the setting of the current command values is ended.

$$Id = -Iam \quad \text{[Formula 24]}$$

$$Iq = 0 \quad \text{[Formula 25]}$$

In the case where the process branches to STEP 70 in FIG. 21, there is an operational condition that the dq induced voltage $V_0$ is higher than the limited voltage $V_{Om}$, and the third dq current setting (Id3, Iq3) cannot be calculated form the formulas (9) and (10). In this case, the current command calculator 50 calculates a fifth dq current setting (Id5, Iq5), which specifies the d-axis current and the q-axis current at the intersection of the maximum torque/magnetic flux curve and the constant induced voltage ellipse, from the formulas (19) to (21).

In the following STEP 71, the current command calculator 50 determines whether or not the magnitude ($\sqrt{(Id5^2 + Iq5^2)}$) of the dq-axis current according to the fifth dq current setting (Id5, Iq5) is equal to or lower than the limited current Iam. If the magnitude ($\sqrt{(Id5^2 + Iq5^2)}$) of the dq-axis current according to the fifth dq current setting (Id5, Iq5) is equal to or lower than the limited current Iam, the process proceeds to STEP 72. In STEP 72, the current command calculator 50 designates the fifth dq current setting (Id5, Iq5) as the current command values (Id_c, Iq_c), the process proceeds to STEP 26 in FIG. 19, and the setting of the current command values is ended.

On the other hand, if the magnitude ($\sqrt{(Id5^2 + Iq5^2)}$) of the dq-axis current according to the fifth dq current setting is higher than the limited current Iam in STEP 71, the process branches to STEP 50. Then, the current command calculator 50 sets the current command values (Id_c, Iq_c) through STEP 50 to STEP 52, or through STEP 50 to STEP 60 described above.

In this embodiment, as shown in the flowchart of FIG. 5, the rotor phase difference is adjusted according to the optimal Ke through STEPS 1 to 4, and then, the current command values (Id_c, Iq_c) are set based on the optimal Ke in STEP 5. However, the advantage of the present invention can be provided even if the processing of STEP 5 is not carried out.

In this embodiment, as shown in the flowcharts of FIGS. 19 to 21, the current command values (Id_c, Iq_c) are calculated based on the first dq current setting, the second dq current setting, the third dq current setting, the fourth dq current setting and the fifth dq current setting. However, the advantage of the present invention can be provided even if the current command values (Id_c, Iq_c) are calculated based on any of only the first dq current setting, only the first dq current setting and the second current setting, only the third dq current setting, only the third dq current setting and the fourth dq current setting, only the fourth dq current setting, or only the fourth dq current setting and the fifth current setting.

In this embodiment, as shown in FIG. 1, the phase detector 26 detects the rotor phase difference, and the detection value Ke_s of the induced voltage constant is calculated from the detection value θd_s of the rotor phase difference. However, the induced voltage constant Ke may be estimated from the command value Vd_c of the d-axis voltage, the command value Vq_c of the q-axis voltage, the detection value Id_s of the d-axis current, and the detection value Iq_s of the q-axis current.

What is claimed is:

1. A controller for a motor that controls the operation of a permanent magnet field type rotary motor that has a first rotor and a second rotor having a plurality of fields constituted by permanent magnets and disposed around a rotating shaft, the controller comprising:

a rotor phase difference changing means that changes a rotor phase difference between said first rotor and said second rotor;

an inverter that converts a direct-current voltage supplied from a direct-current power supply into a polyphase alternating-current voltage and applies the polyphase alternating-current voltage to an armature of said motor; and an energization controlling means that controls a phase current, which is a vector sum of currents flowing through armatures of the respective phases of said motor via said inverter, according to a predetermined torque command, wherein the controller further comprises:

a number-of-revolutions detecting means that detects the number of revolutions of said motor; and a rotor phase difference controlling means that makes said rotor phase difference changing means change said rotor phase difference based on the output voltage of said direct-current power supply, the number of revolutions of said motor, and said torque command in such a manner that the phase current required to produce a torque according to said torque command is minimized.

2. The controller for a motor according to claim 1, wherein said rotor phase difference controlling means applies a correlation map for determining an induced voltage constant that minimizes the phase current of said motor for direct-current voltage supplied to said inverter, number of revolutions of said motor and torque of said motor, which are preset, to the output voltage of said direct-current power supply, the number of revolutions of said motor detected by said number-of-revolutions detecting means and said torque command, thereby obtaining an induced voltage constant therefor, and changes the rotor phase difference of said motor according to the obtained induced voltage constant.

3. The controller for a motor according to claim 2, wherein said motor is converted into an equivalent circuit having a d-axis armature on a d-axis extending in the direction of magnetic fluxes of the fields and a q-axis armature on a q-axis orthogonal to the d-axis, said energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current as a first dq current setting based on the induced voltage constant of said motor according to said rotor phase difference, wherein the combination is among combinations of a d-axis current and a q-axis current that provide the torque according to said torque command, and said current command setting means estimates induced voltages produced in the d-axis armature and the q-axis armature when a d-axis current and a q-axis current according to the first dq current setting are supplied, respectively, based on the induced voltage constant of said motor according to said rotor phase difference and the number of revolutions of said motor, and said current command setting means designates the d-axis current according to the first dq current setting as a command value of the d-axis current and the q-axis current according to the first dq current setting as a command value of the q-axis current in the case where a dq determination voltage, which is a vector sum of the estimated induced voltage produced in the d-axis armature and the estimated induced voltage produced in the q-axis armature, is equal to or lower than a limited voltage set according to the output voltage of said direct-current power supply, and a first dq determination current, which has a magnitude equal to the magnitude of the dq-axis current according to the first dq current setting, is equal to or lower than a predetermined limited current.

4. The controller for a motor according to claim 3, wherein, in the case where said dq determination voltage is equal to or lower than said limited voltage, and said first dq determination current is higher than said limited current, said current command setting means designates a combination of a d-axis current and a q-axis current that makes the magnitude of the dq-axis current equal to the magnitude of said limited current and maximizes the torque of said motor as a second dq current setting and designates the d-axis current according to the second dq current setting as a command value of the d-axis current and the q-axis current according to the second dq current setting as a command value of the q-axis current.

5. The controller for a motor according to claim 2, wherein said motor is converted into an equivalent circuit having a d-axis armature on a d-axis extending in the direction of magnetic fluxes of the fields and a q-axis armature on a q-axis orthogonal to the d-axis, said energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current, as a first dq current setting based on the induced voltage constant of said motor according to said rotor phase difference, wherein the combination is among combinations of a d-axis current and a q-axis current that provide the torque according to said torque command, and said current command setting means estimates induced voltages produced in the d-axis armature and the q-axis armature when a d-axis current and a q-axis current according to the first dq current setting are supplied, respectively, based on the induced voltage constant of said motor according to said rotor phase difference and the number of revolutions of said motor, and said current command setting means designates the d-axis current according to the first dq current setting as a command value of the d-axis current and the q-axis current according to the first dq current setting as a command value of the q-axis current in the case where a dq determination voltage, which is a vector sum of the estimated induced voltage produced in the d-axis armature and the estimated induced voltage produced in the q-axis armature, is equal to or lower than a limited voltage set according to the output voltage of said direct-current power supply, and a first dq determination current, which has a magnitude equal to the magnitude of the dq-axis current according to the first dq current setting, is equal to or lower than a predetermined limited current.

6. The controller for a motor according to claim 5, wherein, in the case where said dq determination voltage is equal to or lower than said limited voltage, and said first dq determination current is higher than said limited current, said current command setting means designates a combination of a d-axis current and a q-axis current that makes the magnitude of the dq-axis current equal to the magnitude of said limited current and maximizes the torque of said motor as a second dq current setting and designates the d-axis current according to the second dq current setting as a command value of the d-axis current and the q-axis current according to the second dq current setting as a command value of the q-axis current.

7. The controller for a motor according to claim 1, wherein said motor is converted into an equivalent circuit having a d-axis armature on a d-axis extending in the direction of magnetic fluxes of the fields and a q-axis armature on a q-axis orthogonal to the d-axis, said energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current as a first dq current setting based on the induced voltage constant of said motor according to said rotor phase difference, wherein the combination is among combinations of a d-axis current and a q-axis current that provide the torque according to said torque command, and said current command setting means estimates induced voltages produced in the d-axis armature and the q-axis armature when a d-axis current and a q-axis current according to the first dq current setting are supplied, respectively, based on the induced voltage constant of said motor according to said rotor phase difference and the number of revolutions of said motor, and said current command setting means determines whether or not a second dq determination current having a magnitude equal to the magnitude of the dq-axis current according to a third dq current setting is equal to or lower than a predetermined limited current if the third dq current setting, which is a combination of a d-axis current and a q-axis current that maximizes the torque of said motor, can be calculated in the case where a dq determination voltage, which is a vector sum of the estimated induced voltage produced in the d-axis armature and the estimated induced voltage produced in the q-axis armature, is higher than a limited voltage set according to the output voltage of said direct-current power supply, and a dq induced voltage, which is a vector sum of the induced voltage produced in the d-axis armature and the induced voltage produced in the q-axis armature, is equal to said limited voltage, and designates the d-axis current according to the third dq current setting as a command value of the d-axis current and the q-axis current according to the third dq current setting as a command value of the q-axis current if the second dq determination current is equal to or lower than the limited current.

8. The controller for a motor according to claim 7, wherein, when it is found that said second dq determination current is higher than said limited current as the result of the determination of whether or not said second dq determination current is equal to or lower than said limited current, said current command setting means determines whether or not a fourth dq current setting, which is a combination of a d-axis current and a q-axis current that makes the magnitude of the dq-axis current equal to the magnitude of the limited current and makes the dq induced voltage equal to said limited current, can be calculated, and designates the d-axis current according to the fourth dq current setting as a command value of the d-axis current and the q-axis current according to the fourth dq current setting as a command value of the q-axis current if it is determined that the fourth dq current setting can be calculated.

9. The controller for a motor according to claim 2, wherein said motor is converted into an equivalent circuit having a d-axis armature on a d-axis extending in the direction of magnetic fluxes of the fields and a q-axis armature on a q-axis orthogonal to the d-axis, said energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current as a first dq current setting based on the induced voltage constant of said motor according to said rotor phase difference, wherein the combination is among combinations of a d-axis current and a q-axis current that provide the torque according to said torque command, and said current command setting means estimates induced voltages produced in the d-axis armature and the q-axis armature when a d-axis current and a q-axis current according to the first dq current setting are supplied, respectively, based on the induced voltage constant of said motor according to said rotor phase difference and the number of revolutions of said motor, and said current command setting means determines whether or not a second dq determination current having a magnitude equal to the magnitude of the dq-axis current according to a third dq current setting is equal to or lower than a predetermined limited current if the third dq current setting, which is a combination of a d-axis current and a q-axis current that maximizes the torque of said motor, can be calculated in the case where a dq determination voltage, which is a vector sum of the estimated induced voltage produced in the d-axis armature and the estimated induced voltage produced in the q-axis armature, is higher than a limited voltage set according to the output voltage of said direct-current power supply, and a dq induced voltage, which is a vector sum of the induced voltage produced in the d-axis armature and the induced voltage produced in the q-axis armature, is equal to said limited voltage, and designates the d-axis current according to the third dq current setting as a command value of the d-axis current and the q-axis current according to the third dq current setting as a command value of the q-axis current if the second dq determination current is equal to or lower than the limited current.

10. The controller for a motor according to claim 9, wherein, when it is found that said second dq determination current is higher than said limited current as the result of the determination of whether or not said second dq determination current is equal to or lower than said limited current, said current command setting means determines whether or not a fourth dq current setting, which is a combination of a d-axis current and a q-axis current that makes the magnitude of the dq-axis current equal to the magnitude of the limited current and makes the dq induced voltage equal to said limited current, can be calculated, and designates the d-axis current according to the fourth dq current setting as a command value of the d-axis current and the q-axis current according to the fourth dq current setting as a command value of the q-axis current if it is determined that the fourth dq current setting can be calculated.

11. The controller for a motor according to claim 1, wherein said motor is converted into an equivalent circuit having a d-axis armature on a d-axis extending in the direction of magnetic fluxes of the fields and a q-axis armature on a q-axis orthogonal to the d-axis, said energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current, as a first dq current setting based on the induced voltage constant of said motor according to said rotor phase difference, wherein the combination is among combinations of a d-axis current and a q-axis current that provide the torque according to said torque command, and said current command setting means estimates induced voltages produced in the d-axis armature and the q-axis armature when a d-axis current and a q-axis current according to the first dq current setting are supplied, respectively, based on the induced voltage constant of said motor according to said rotor phase difference and the number of revolutions of said motor, and said current command setting means calculates a fifth dq current setting, which is a combination of a d-axis current and a q-axis current that maximizes the torque of said motor for the induced voltage constant of said motor and makes said dq induced voltage equal to said limited voltage, if a third dq current setting, which is a combination of a d-axis current and a q-axis current that maximizes the torque of said motor, cannot be calculated in the case where a dq determination voltage, which is a vector sum of the estimated induced voltage produced in the d-axis armature and the estimated induced voltage produced in the q-axis armature, is higher than a limited voltage set according to the output voltage of said direct-current power supply, and a dq induced voltage, which is a vector sum of the induced voltage produced in the d-axis armature and the induced voltage produced in the q-axis armature, is equal to said limited voltage, and said current command setting means determines whether or not a third determination current having a magnitude equal to the magnitude of the dq-axis current according to the fifth dq current setting is equal to or lower than said limited current, and designates the d-axis current according to the fifth dq current setting as a command value of the d-axis current and the q-axis current according to the fifth dq current setting as a command value of the q-axis current if the third determination current is equal to or lower than said limited current.

12. The controller for a motor according to claim 11, wherein, in the case where it is found that said third dq determination current is higher than said limited current as the result of the determination of whether or not said third dq determination current is equal to or lower than said limited current, said current command setting means determines whether or not a fourth dq current setting, which is a combination of a d-axis current and a q-axis current that makes the magnitude of the dq-axis current equal to the magnitude of the limited current and makes the dq induced voltage equal to said limited current, can be calculated, and designates the d-axis current according to the fourth dq current setting as a command value of the d-axis current and the q-axis current according to the fourth dq current setting as a command value of the q-axis current if it is determined that the fourth dq current setting can be calculated.

13. The controller for a motor according to claim 2, wherein said motor is converted into an equivalent circuit having a d-axis armature on a d-axis extending in the direction of magnetic fluxes of the fields and a q-axis armature on a q-axis orthogonal to the d-axis, said energization controlling means carries out energization control in such a manner that the difference between an actual value and a command value of the d-axis current, which is a current flowing through the d-axis armature, is reduced, and the difference between an actual value and a command value of the q-axis current, which is a current flowing through the q-axis armature, is reduced, and the controller further comprises a current command setting means that designates a combination of a d-axis current and a q-axis current that minimizes the magnitude of a dq-axis current, which is a vector sum of the d-axis current and the q-axis current, as a first dq current setting based on the induced voltage constant of said motor according to said rotor phase difference, wherein the combination is among combinations of a d-axis current and a q-axis current that provide the torque according to said torque command, and said current command setting means estimates induced voltages produced in the d-axis armature and the q-axis armature when a d-axis current and a q-axis current according to the first dq current setting are supplied, respectively, based on the induced voltage constant of said motor according to said rotor phase difference and the number of revolutions of said motor, and said current command setting means calculates a fifth dq current setting, which is a combination of a d-axis current and a q-axis current that maximizes the torque of said motor for the induced voltage constant of said motor and makes said dq induced voltage equal to said limited voltage, if a third dq current setting, which is a combination of a d-axis current and a q-axis current that maximizes the torque of said motor, cannot be calculated in the case where a dq determination voltage, which is a vector sum of the estimated induced voltage produced in the d-axis armature and the estimated induced voltage produced in the q-axis armature, is higher than a limited voltage set according to the output voltage of said direct-current power supply, and a dq induced voltage, which is a vector sum of the induced voltage produced in the d-axis armature and the induced voltage produced in the q-axis armature, is equal to said limited voltage, and said current command setting means determines whether or not a third determination current having a magnitude equal to the magnitude of the dq-axis current according to the fifth dq current setting is equal to or lower than said limited current, and designates the d-axis current according to the fifth dq current setting as a command value of the d-axis current and the q-axis current according to the fifth dq current setting as a command value of the q-axis current if the third determination current is equal to or lower than said limited current.

14. The controller for a motor according to claim 13, wherein, in the case where it is found that said third dq determination current is higher than said limited current as the result of the determination of whether or not said third dq determination current is equal to or lower than said limited current, said current command setting means determines whether or not a fourth dq current setting, which is a combination of a d-axis current and a q-axis current that makes the magnitude of the dq-axis current equal to the magnitude of the limited current and makes the dq induced voltage equal to said limited current, can be calculated, and designates the d-axis current according to the fourth dq current setting as a command value of the d-axis current and the q-axis current according to the fourth dq current setting as a command value of the q-axis current if it is determined that the fourth dq current setting can be calculated.

* * * * *